(12) United States Patent
Biskeborn et al.

(10) Patent No.: US 9,653,114 B1
(45) Date of Patent: May 16, 2017

(54) DETECTING MEDIA DEFECTS

(71) Applicant: International Business Machines Corporation, Armonk, NY (US)

(72) Inventors: Robert G. Biskeborn, Hollister, CA (US); Edwin R. Childers, Tucson, AZ (US); Jason Liang, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/290,966

(22) Filed: Oct. 11, 2016

(51) Int. Cl.
*G11B 5/09* (2006.01)
*G11B 20/18* (2006.01)
*G11B 5/008* (2006.01)
*G11B 5/31* (2006.01)

(52) U.S. Cl.
CPC ...... *G11B 20/1816* (2013.01); *G11B 5/00813* (2013.01); *G11B 5/313* (2013.01); *G11B 2020/1826* (2013.01)

(58) Field of Classification Search
None
See application file for complete search history.

(56) References Cited

U.S. PATENT DOCUMENTS

| | | | |
|---|---|---|---|
| 5,963,389 A | 10/1999 | Wojciechowski et al. | |
| 7,684,147 B2 * | 3/2010 | Ahn | B82Y 25/00 257/421 |
| 2002/0131215 A1* | 9/2002 | Beach | B82Y 10/00 360/324.2 |
| 2002/0181133 A1 | 12/2002 | Koshkina et al. | |
| 2002/0181167 A1* | 12/2002 | Gambino | B82Y 10/00 360/324 |
| 2003/0058556 A1 | 3/2003 | Komai | |
| 2004/0257715 A1 | 12/2004 | Heim et al. | |
| 2004/0264023 A1 | 12/2004 | Kimura et al. | |

(Continued)

FOREIGN PATENT DOCUMENTS

| | | |
|---|---|---|
| WO | 0141140 A1 | 6/2001 |
| WO | 2007102495 A1 | 9/2007 |
| WO | 2010078992 A1 | 7/2010 |

OTHER PUBLICATIONS

Biskeborn R., U.S. Appl. No. 15/290,978, filed Oct. 11, 2016.

(Continued)

*Primary Examiner* — Peter Vincent Agustin
(74) *Attorney, Agent, or Firm* — Zilka-Kotab, PC

(57) ABSTRACT

An apparatus according to one embodiment includes at least one write transducer, and a plurality of detector structures positioned in an array. Each of the detector structures includes a pair of conductive layers separated by an insulating material. None of the detector structures include an operable reader for reading data from a magnetic medium. A computer-implemented method according to one embodiment includes monitoring a resistance value of each of a plurality of detector structures positioned in an array, and detecting a change in a resistance value of at least one of the detector structures for identifying a defect on a magnetic medium. Each of the detector structures include a pair of conductive layers separated by an insulating material. None of the detector structures include an operable reader for reading data from a magnetic medium.

20 Claims, 16 Drawing Sheets

(56) References Cited

U.S. PATENT DOCUMENTS

| | | | |
|---|---|---|---|
| 2006/0212978 A1* | 9/2006 | Brandenberger | B82Y 10/00 369/13.01 |
| 2007/0064348 A1* | 3/2007 | Stipe | G11B 5/3169 360/320 |
| 2007/0201160 A1* | 8/2007 | Albrecht | G11B 5/397 360/75 |
| 2013/0094105 A1 | 4/2013 | Nylander-Hill et al. | |
| 2014/0211337 A1 | 7/2014 | Tan et al. | |

OTHER PUBLICATIONS

List of IBM Patents or Patent Applications Treated as Related.
Smith, et al., "Chip-Size Magnetic Sensor Arrays," Sensors EXPO, May 21, 2002, pp. 1-11.
Tan et al., "Detection of Media Defects in Perpendicular Recording," Digests of the IEEE International, IEEE, 2005, pp. 1.
Non-Final Office Action from U.S. Appl. No. 15/290,978, dated Jan. 18, 2017.

* cited by examiner

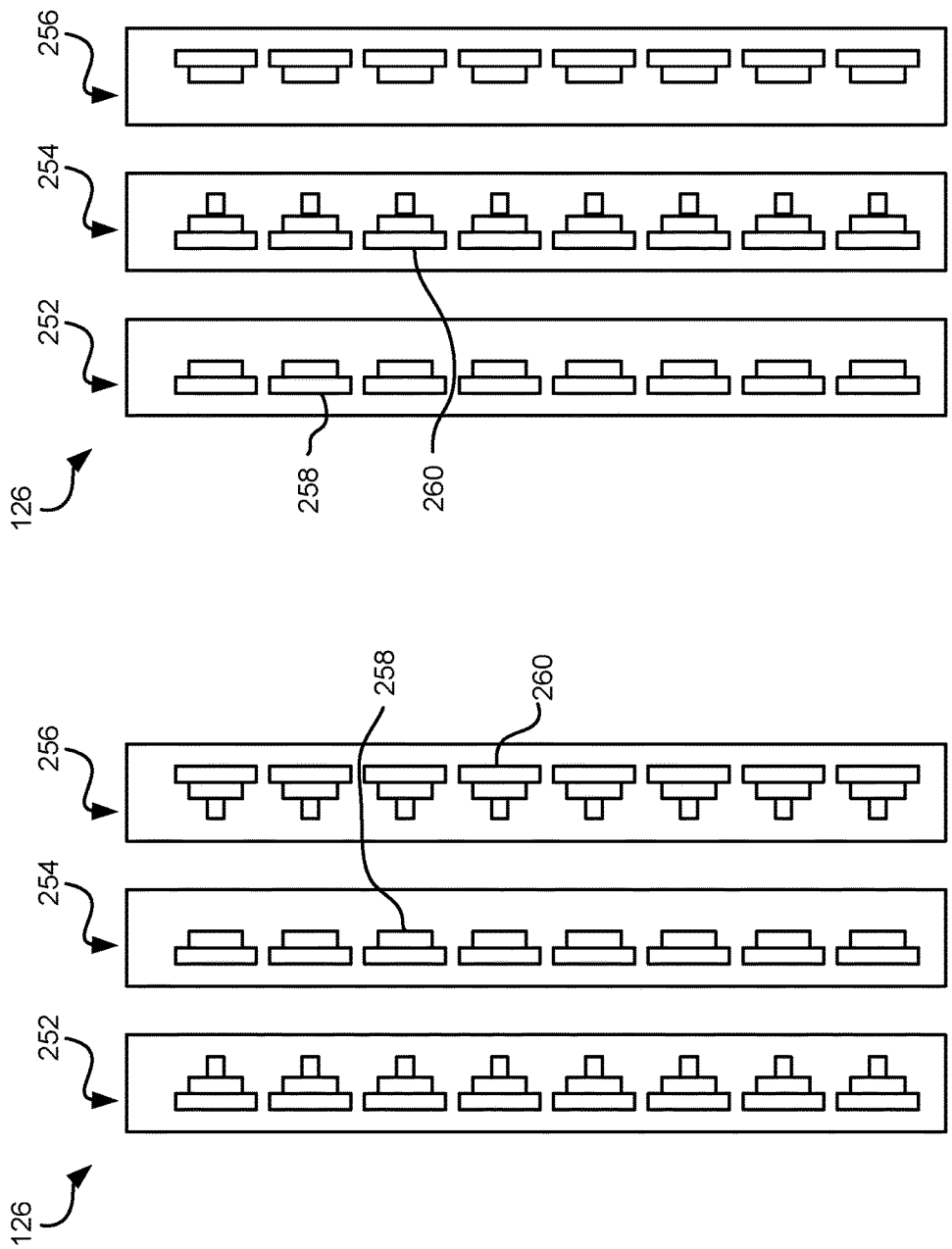

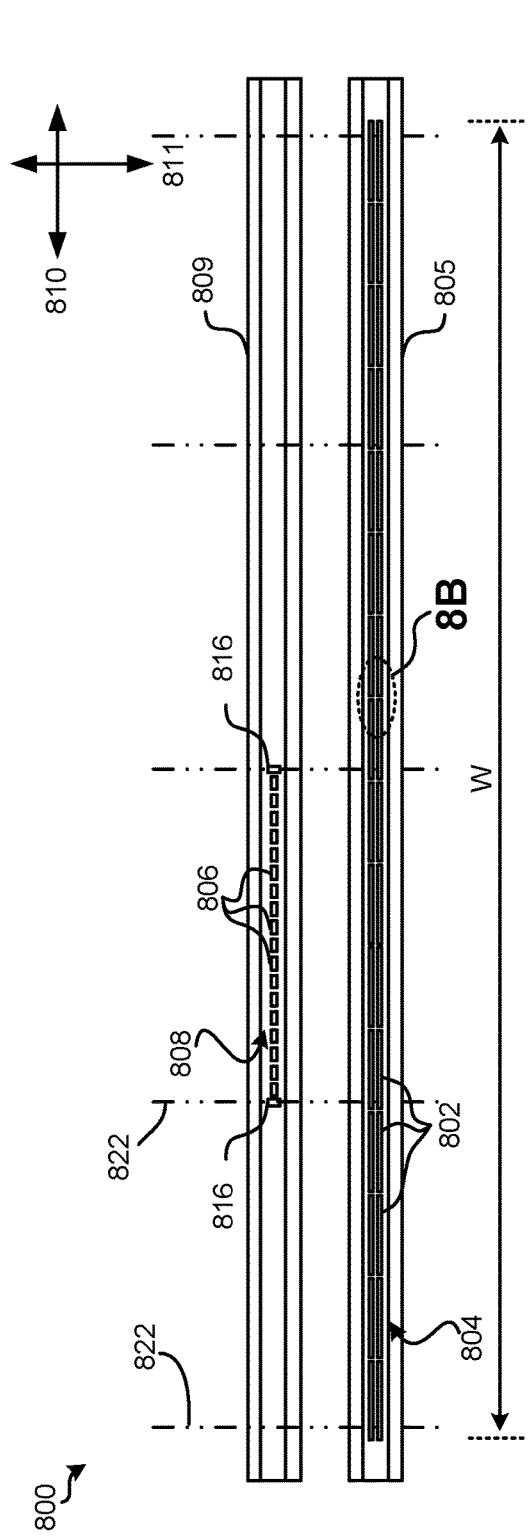
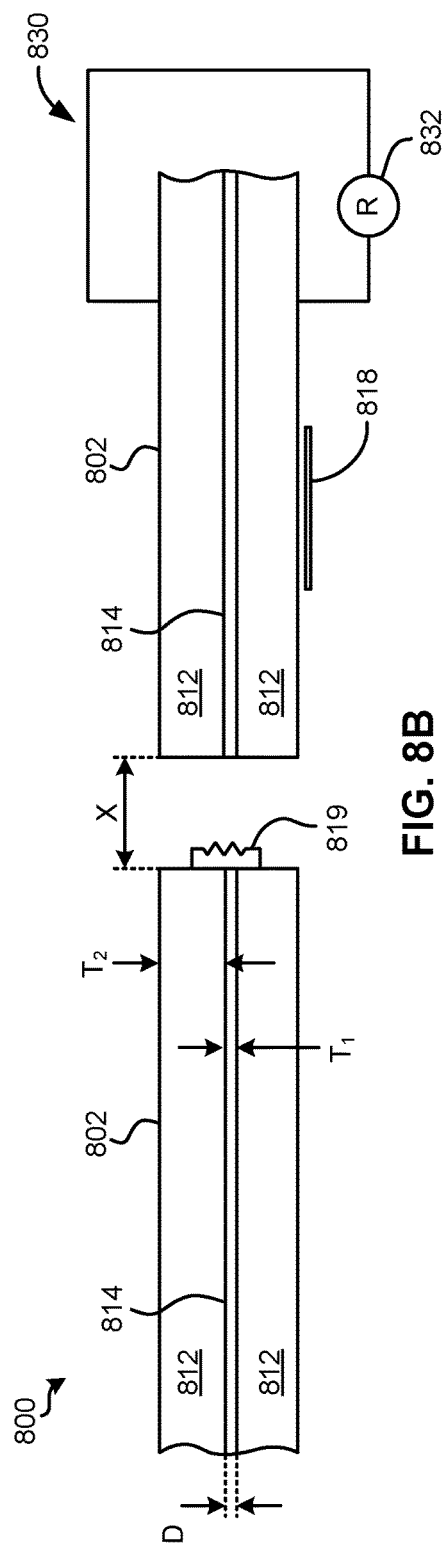
FIG. 8A
FIG. 8B

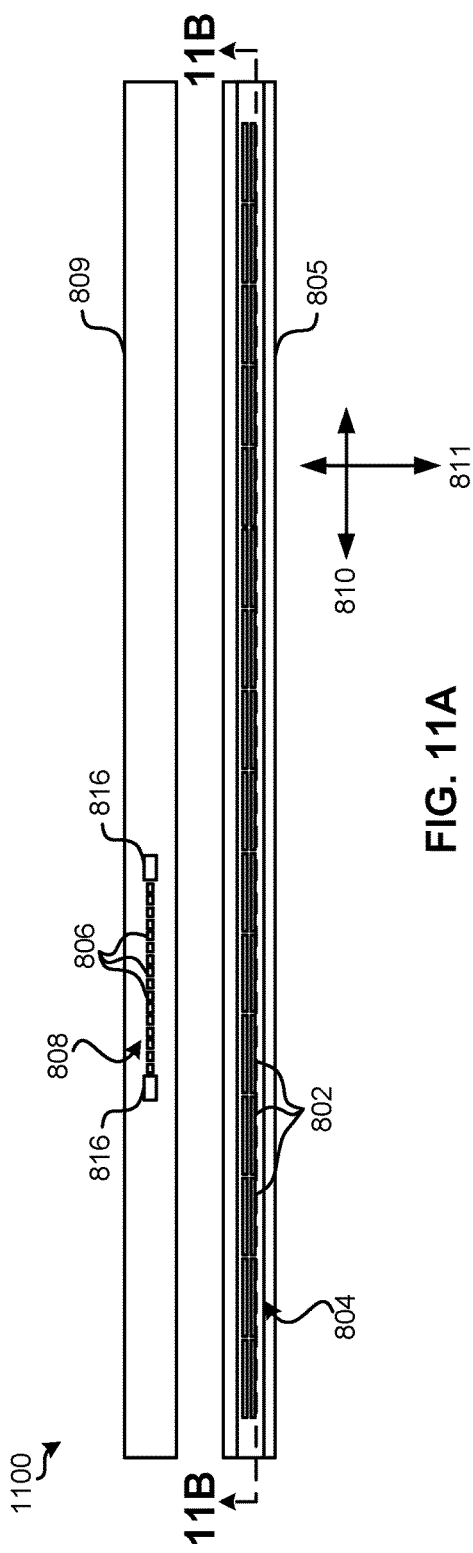
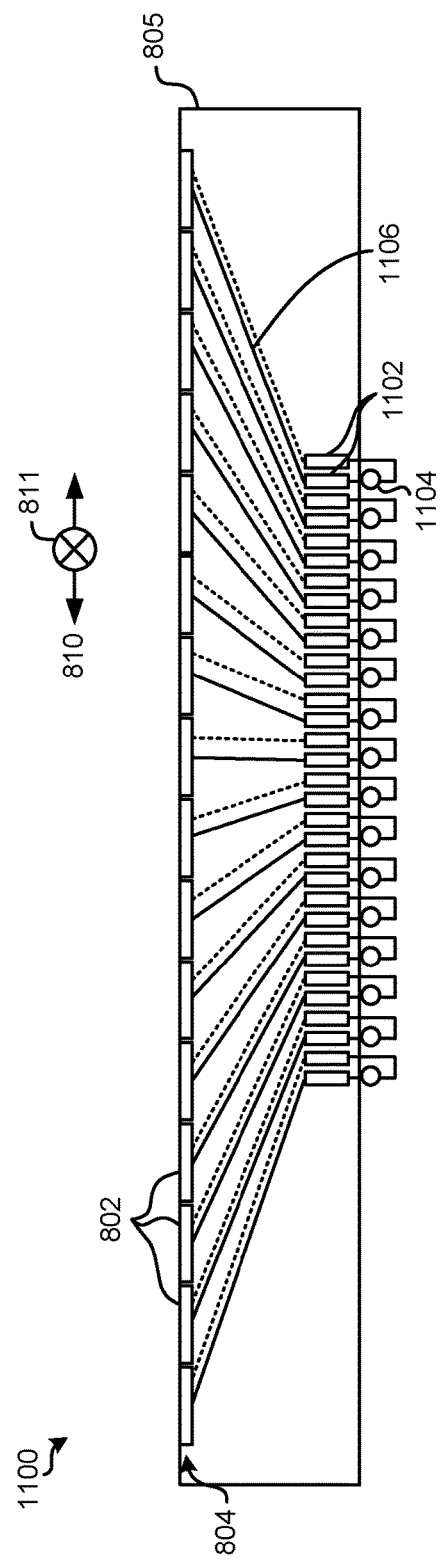
FIG. 11A
FIG. 11B

DETECTING MEDIA DEFECTS

BACKGROUND

The present invention relates to data storage systems, and more particularly, this invention relates to detecting defects on magnetic tape media.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial; therefore, such systems attempt to position the recording gaps of the transducers, which are the source of the magnetic recording flux, in near contact with the tape to effect sharp written transitions, and to position the read elements in near contact with the tape to provide effective coupling of the magnetic field from the tape to the read elements.

Magnetic tape media sometimes has defects that protrude from the surface of the magnetic tape media. In tape recording, the media runs in contact with the transducers in the head, thus making the transducers susceptible to effects of media defects.

SUMMARY

An apparatus according to one embodiment includes at least one write transducer, and a plurality of detector structures positioned in an array. Each of the detector structures includes a pair of conductive layers separated by an insulating material. None of the detector structures include an operable reader for reading data from a magnetic medium.

A computer-implemented method according to one embodiment includes monitoring a resistance value of each of a plurality of detector structures positioned in an array, and detecting a change in a resistance value of at least one of the detector structures for identifying a defect on a magnetic medium. Each of the detector structures include a pair of conductive layers separated by an insulating material. None of the detector structures include an operable reader for reading data from a magnetic medium.

A computer program product according to one embodiment includes a computer readable storage medium having program instructions embodied therewith, the program instructions executable by a controller to cause the controller to monitor, by the controller, a resistance value of each of a plurality of detector structures positioned in an array. Program instructions are also included to cause the controller to detect, by the controller, a change in a resistance value of at least one of the detector structures, for identifying an approximate location of defect on a magnetic medium, and cause, by the controller, a write transducer to write a signal burst on the magnetic medium in response to detecting the change in resistance value. Each of the detector structures includes a pair of conductive layers separated by an insulating material. None of the detector structures include an operable reader for reading data from a magnetic medium.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIG. 8A is a partial top-down view of an apparatus according to one embodiment.

FIG. 8B is a partial detailed view of the apparatus of FIG. 8A taken from circle 8B of FIG. 8A.

FIG. 11A is a partial top-down view of an apparatus according to one embodiment.

FIG. 11B is a partial cross-sectional view of the apparatus of FIG. 11A taken along line 11B-11B of FIG. 11A, with a representation of a wiring scheme.

DETAILED DESCRIPTION

Figure 1A:
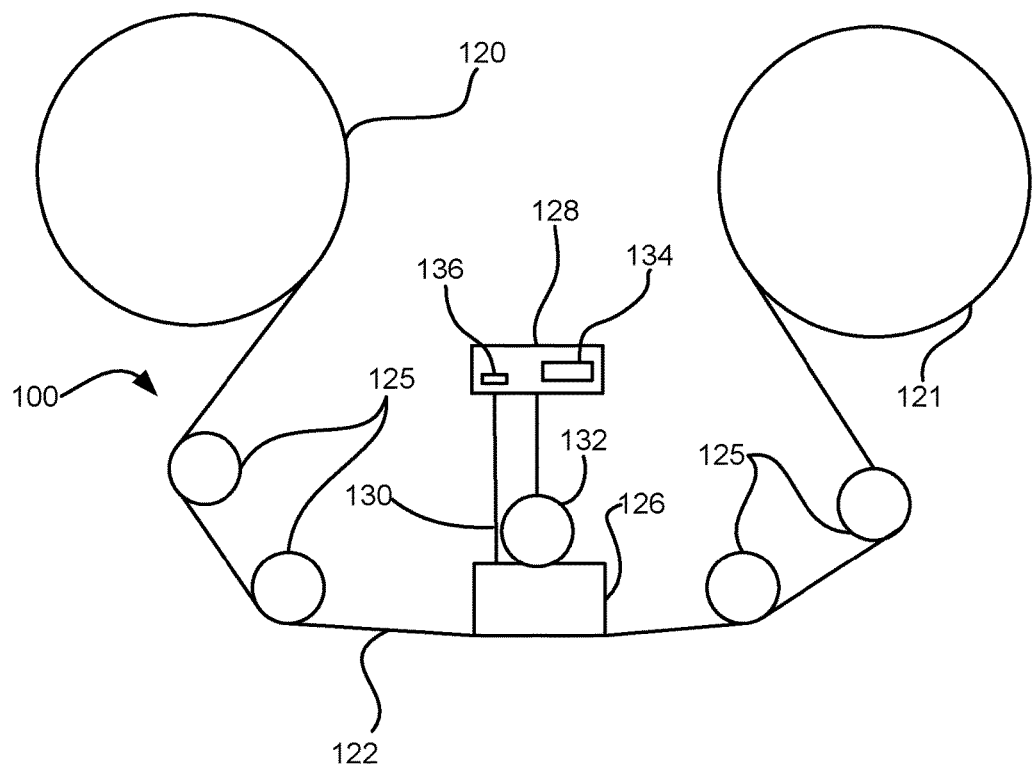
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of systems that may be able to detect defects and/or determine whether the amount of burnishing performed on a given media meets specified requirements, as well as operation and/or component parts of such systems. Thus, some of the embodiments described herein may be able to determine whether the amount of burnishing performed on the media is sufficient to reduce the likelihood of damaging transducers brought into contact therewith to an acceptable level.

In one general embodiment, an apparatus includes at least one write transducer, and a plurality of detector structures positioned in an array. Each of the detector structures includes a pair of conductive layers separated by an insulating material. None of the detector structures include an operable reader for reading data from a magnetic medium.

In another general embodiment, a computer-implemented method includes monitoring a resistance value of each of a plurality of detector structures positioned in an array, and detecting a change in a resistance value of at least one of the detector structures for identifying a defect on a magnetic medium. Each of the detector structures include a pair of conductive layers separated by an insulating material. None of the detector structures include an operable reader for reading data from a magnetic medium.

In yet another general embodiment, a computer program product includes a computer readable storage medium having program instructions embodied therewith, the program instructions executable by a controller to cause the controller to monitor, by the controller, a resistance value of each of a plurality of detector structures positioned in an array. Program instructions are also included to cause the controller to detect, by the controller, a change in a resistance value of at least one of the detector structures, for identifying an approximate location of defect on a magnetic medium, and cause, by the controller, a write transducer to write a signal burst on the magnetic medium in response to detecting the change in resistance value. Each of the detector structures includes a pair of conductive layers separated by an insulating material. None of the detector structures include an operable reader for reading data from a magnetic medium.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
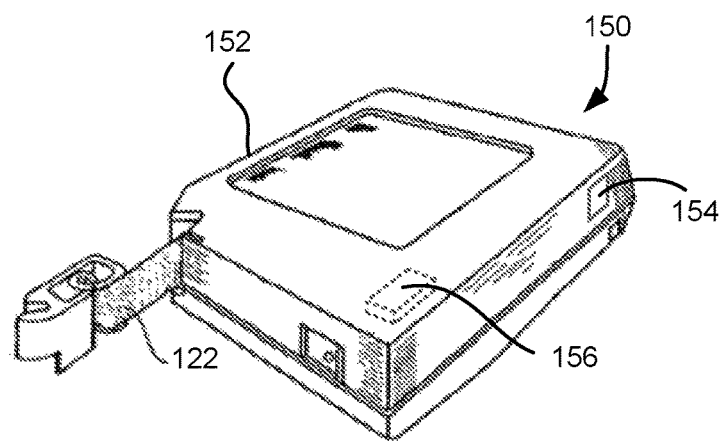
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
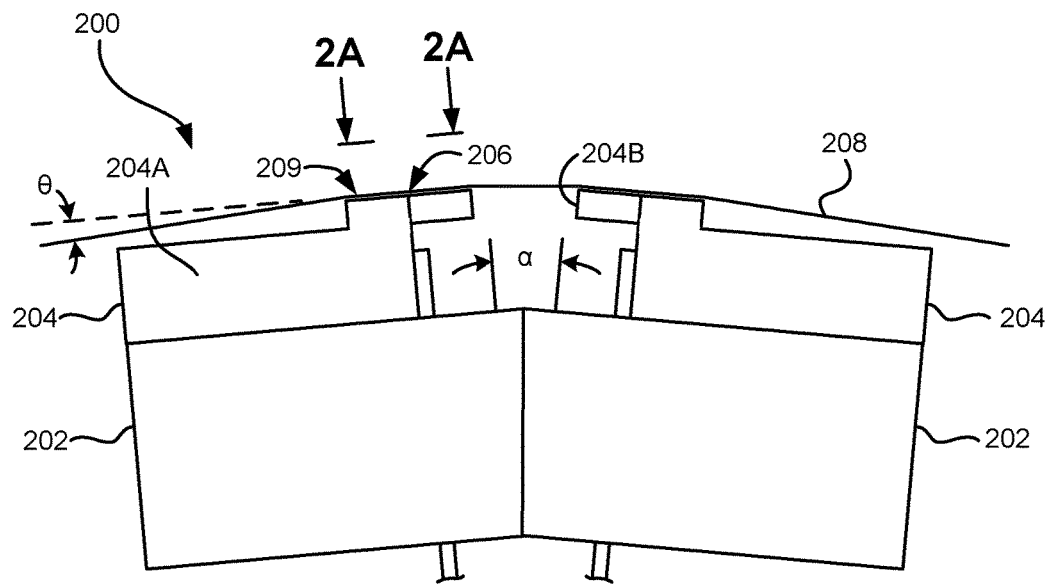
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
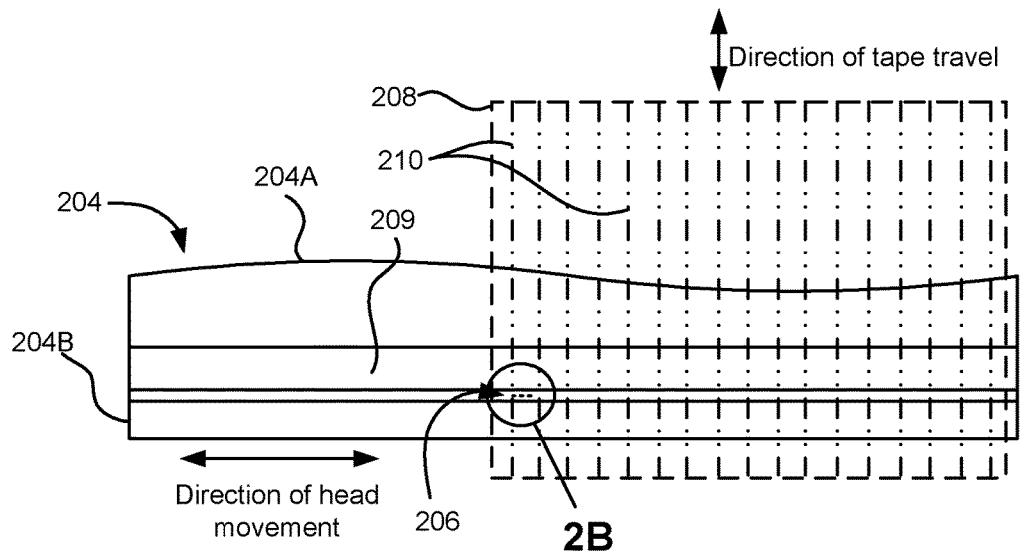
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
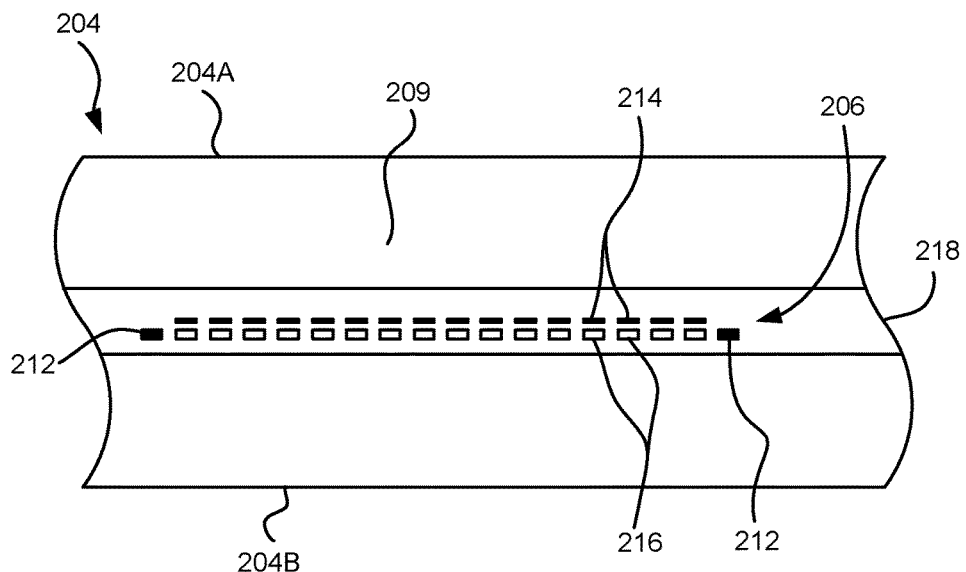
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
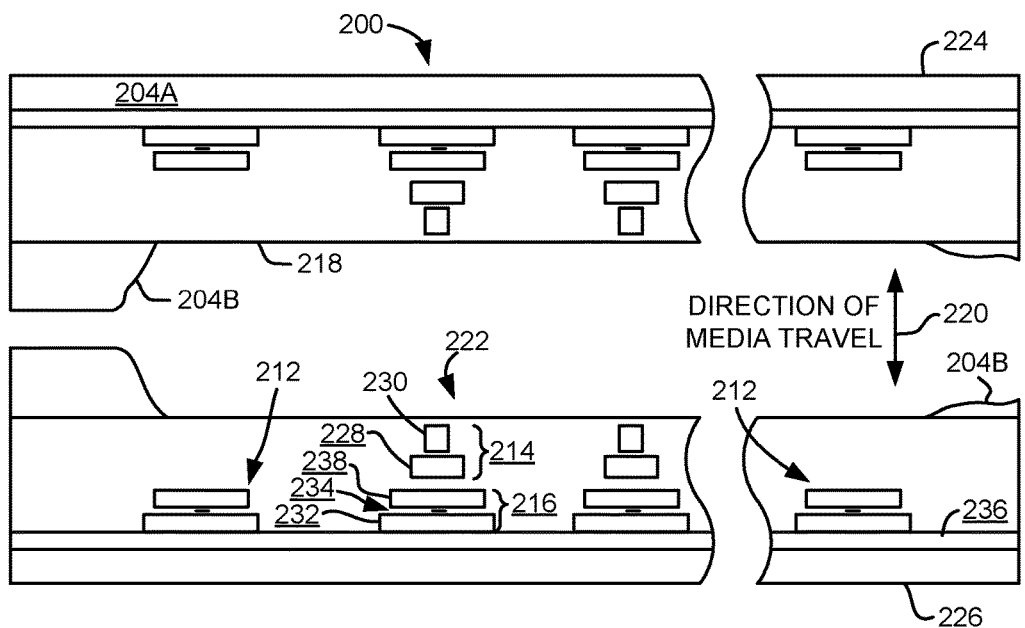
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
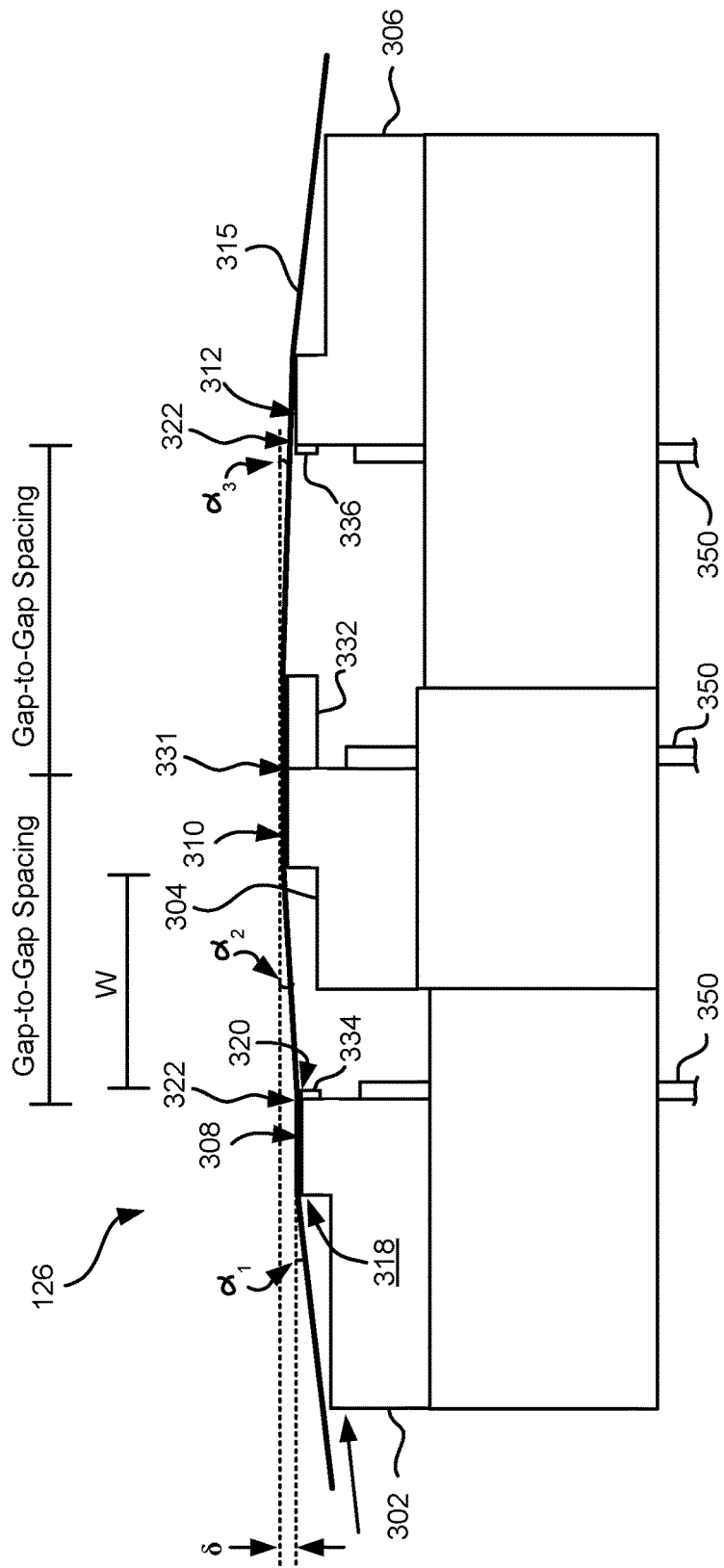
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
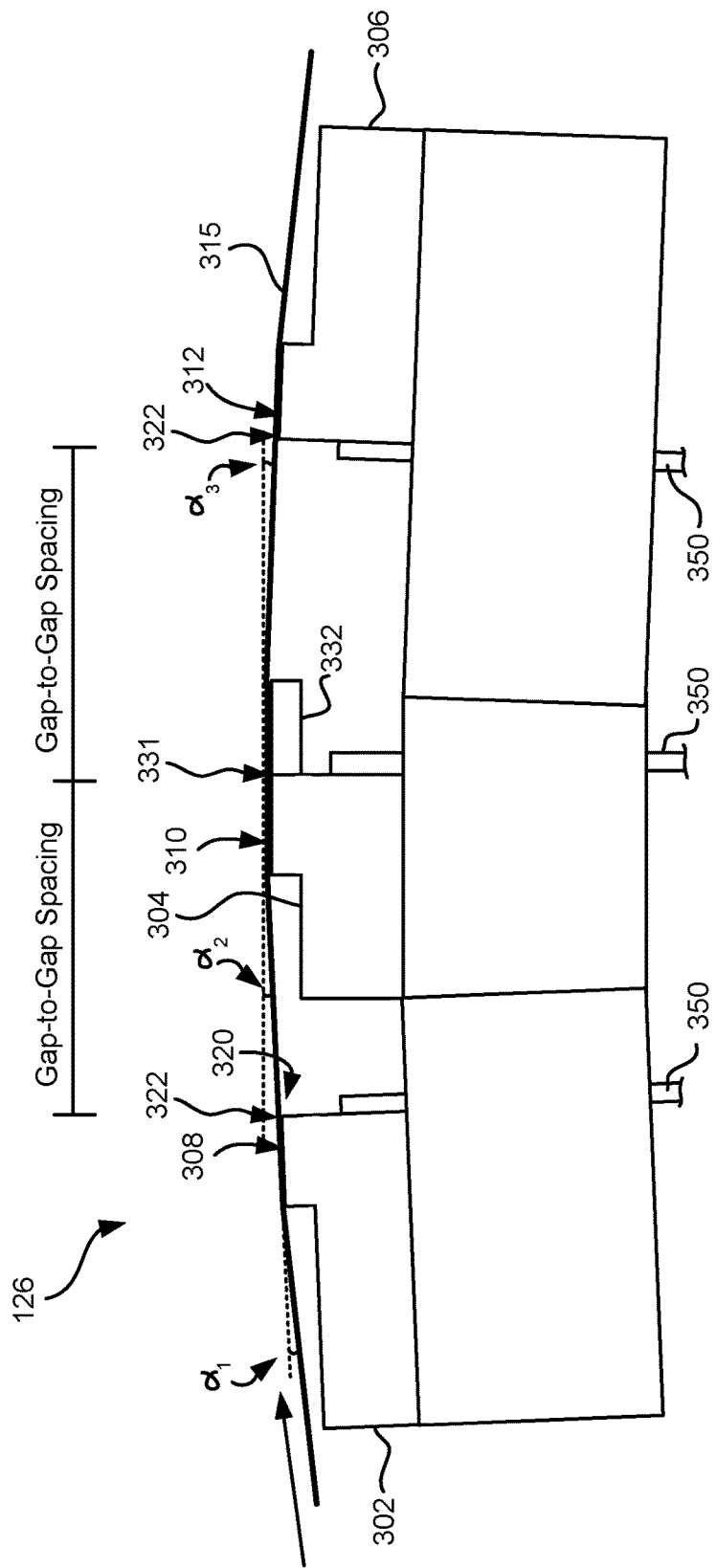
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
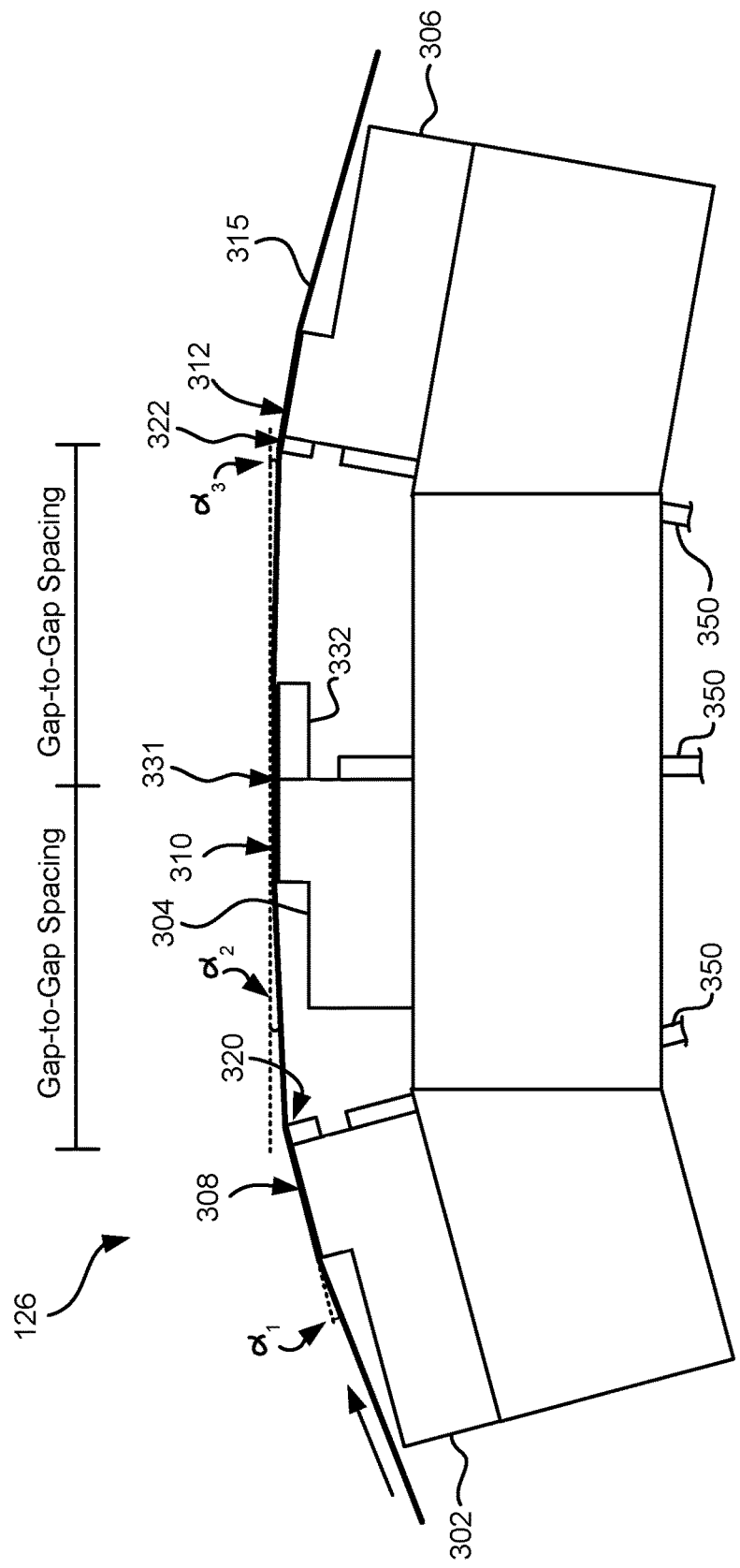
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

As mentioned above, magnetic tapes often include defects disseminated across the surface area of the tape, and which protrude therefrom. In tape recording, the media runs in contact with the head, thus making the transducers susceptible to effects of media defects. For example, defects can scratch the leading sensor shield or other layer, and smear conductive material across the sensor, thereby creating a short. Such short adversely affects the signal derived from the sensor, and in many cases renders the sensor non-functional.

Friction between asperities on the tape and the ductile metallic films in the sensor gives rise to deformation forces in the direction of tape motion. As a result, an electrical short is created by the scratching and/or smearing across the layers, where the shorting has a net effect of creating bridges of conductive material across the sensor. Particularly, the lapping particles may plow through ductile magnetic material, e.g., from one or both shields, smearing the metal across the insulating material, and thereby creating an electrical short that reduces the effective resistance of the sensor and diminishes the sensitivity of the sensor as a whole.

Scientists and engineers familiar with tape recording technology would not necessarily expect a CPP MR sensor to remain operable in a contact recording environment, such as tape data storage, because of a high probability that abrasive asperities embedded in the recording medium will scrape conductive material across the thin insulating layer during tape travel, thereby creating the aforementioned shorting.

Typical CPP MR sensors such as TMR sensors in hard disk drive applications are configured to be in electrical contact with the top and bottom shields of read head structures. In such configurations the current flow is constrained to traveling between the top shield and the bottom shield through the sensor, by an insulator layer with a thickness of about 3 to about 10 nanometers (nm). This insulator layer extends below the hard bias magnet layer (if present) to insulate the bottom of the hard bias magnet from the bottom shield/lead layers, and isolates the edges of the sensor from the hard bias magnet material. In a tape environment, where the sensor is in contact with the tape media, in one mode, smearing of the top or bottom shield material can bridge the insulation layer separating the hard bias magnet from the bottom lead and lower shield, thereby shorting the sensor. Further, in another mode, shield deformation or smearing or sensor layer smearing can create a conductive bridge across a tunnel barrier layer in a TMR sensor. Such tunnel barrier layer may be only 12-15 angstroms thick or less.

In disk drives, conventional CPP MR designs are acceptable because there is minimal contact between the head and the media. However, for tape recording, the head and the media are in constant contact. Head coating has been cited as a possible solution to these shorting issues; however, tape particles and asperities have been known to scratch through and/or wear away these coating materials as well. Because the insulating layers of a conventional CPP MR sensor are so thin, the propensity for electrical shorting due, e.g., to scratches, material deposits, surface defects, films deformation, etc., is relatively high.

Burnishing may be employed in an attempt to effectively "blunt" such defects and mitigate their effect on transducers. However, production limitations associated with cost limit the time available for burnishing. Even when burnishing is performed on a given tape, existing systems are unable to determine if the burnishing performed was adequate in the limited time available.

In sharp contrast, various embodiments described herein are able to detect defects and/or determine if the amount of burnishing performed on a given media meets specified requirements. Thus, embodiments described herein may be able to determine whether the amount of burnishing performed is sufficient to reduce the likelihood of damaging transducers brought into contact therewith to an acceptable level. Moreover, media that does not meet requirements (e.g., that has not been sufficiently burnished) may be dealt with accordingly, e.g., by being burnished further, rejected entirely, reformulated to fix the particular issue, etc., as will be described in further detail below.

FIGS. 8A-8B depict an apparatus 800 in accordance with one embodiment. As an option, the present apparatus 800 may be implemented in conjunction with features from any other embodiment listed herein, such as those described with reference to the other FIGS. However, such apparatus 800 and others presented herein may be used in various applications and/or in permutations which may or may not be specifically described in the illustrative embodiments listed herein. Further, the apparatus 800 presented herein may be used in any desired environment.

Apparatus 800 includes a plurality of detector structures 802 positioned in a first array 804 and one or more write transducers 806 positioned in a second array 808. Moreover, a servo reader 816 may be positioned on either side of the array 808 of write transducers 806, e.g., to enable track following during detection as described below. The servo readers 816 are positioned to read servo tracks 822 on the magnetic tape. In the present illustrative embodiment, five servo tracks 822 are shown, defining four servo bands therebetween.

The detector structures 802 are preferably configured such that they may be used to detect defects on a magnetic medium, e.g., such as asperities protruding from the surface of a magnetic tape. As alluded to above, the ability to detect such defects on a magnetic medium may reduce the likelihood of damaging transducers brought into contact with the magnetic medium during use. For example, the quantity and/or severity of defects detected on a given magnetic medium may be compared with quality control levels for that magnetic medium to determine whether the medium is fit for use. Depending on whether a magnetic medium meets corresponding quality control levels, action may be taken as desired (e.g., see method 1000 below). It should be noted that various approaches included below are described with reference to magnetic tape; however, this is in no way intended to limit the invention, but rather is presented by way of example only. Any of the approaches described herein may be implemented with any other desired type of magnetic medium.

Referring specifically now to the detailed view in FIG. 8B, each of the detector structures 802 preferably include a pair of conductive layers 812 separated by an insulating material 814. According to the present embodiment, the insulating material 814 is the only layer positioned between the conductive layers 812 in each of the detector structures 802. Thus, a distance D separating the conductive layers of each of the detector structures 802, measured in an intended direction of magnetic media travel 811, may be reduced, e.g., compared to a shield-to-shield spacing in a standard read sensor. The distance D may be in a range of from about 2 nm to about 10 nm, but could be higher or lower, e.g., depending on the desired approach. Thus, a thickness $T_1$ of the insulating material 814 measured in the intended direction of magnetic media travel 811 may be in a range of from about 2 nm to about 10 nm, but could be higher or lower, e.g., depending on the desired approach. Furthermore, a thickness $T_2$ of one or both of the conductive layers 812 may be in a range of from about 50 nm to about 1.2 μm, but could be higher or lower. Because the thickness $T_1$ is so small, the detector structure is prone to shunting due to pinholes and possible damage due to electrostatic discharge (ESD). Accordingly, the stripe height of the conductive layers 812, measured in a direction into the page of FIGS. 8A and 8B, is preferably small to minimize the surface area of the opposing faces of the conductive layers 812, thereby reducing the probability of such shunts occurring, e.g., via pinholes. Therefore, electronic lapping guides (ELGs) 818 of conventional construction may be used to control an extent of lapping in the stripe height direction when setting the stripe height of the conductive layers. Preferably, an ELG is provided for each detector structure, but more of fewer ELGs may be present. An illustrative stripe height of the conductive layers 812 may be in a range of about 0.2 to about 0.8 microns, but could be higher or lower.

A resistor 819 may be connected between the conductive layers 812 to prevent charge buildup on one of the conductive layers 812, thereby reducing the chance of an ESD event. The resistor may be of conventional construction, and may be internal or external. In one approach, an ELG may serve as the resistor.

In some approaches, the insulating material 814 may be recessed relative to the conductive layers 812 (not shown) in a direction perpendicular to the plane created by the intended direction of magnetic media travel 811 and the cross-track direction 810. Recessing the insulating material 814 relative to the conductive layers 812 may increase the likelihood that a defect will create a smear from one conductive layer to the other, and therefore recession may be included to increase sensitivity of the detector structures 802. According to an exemplary approach, the insulating material 814 may be recessed 2 nm or more relative to the conductive layers 812, but the recession could be higher or lower.

It follows that any one or more of the detector structures 802 may not include an operable reader for reading data from a magnetic tape. Consequently, the detector structures 802 are not physically capable of reading written data in the present embodiment. However, the detector structures 802 are able to allow detection of defects on a magnetic tape passed thereover.

In other embodiments, the detector structures 802 may include CPP sensors such as tunnel valve sensors. The widths of such detector structures 802 with sensors may be wider than would be practical for data reading operations, so as to cover more surface area of the tape passing thereby to maximize detection. The distance D between the conductive layers 812 may be larger than previously described to accommodate the sensor stack. In some embodiments, such CPP sensors may not have hard bias magnets, which could otherwise result in a larger D.

As a magnetic medium (e.g., tape) is passed over the detector structures 802, defects on the magnetic medium may cause material from one of the conductive layers 812 to smear across the insulating material 814, and to the opposite conductive layer 812. As would be appreciated by one skilled in the art upon reading the present description, creating such a smear of conducive material across the insulating material 814 may cause at least a partial electrical short (e.g., a detectable drop in the resistance value between the conductive layers 812). Thus, by measuring and monitoring a resistance value between the conductive layers 812, defects on a magnetic tape may be identified by noting changes in the resistance value for a given detector structure 802. It should be mentioned that while some shorts may render the detector structures 802 inoperative, other shorts may not render the detector structures 802 inoperative, i.e., the detector structure can continue to be used.

FIG. 8B depicts a representation of an illustrative detector circuit 830 that may be used to detect the change in resistance value for the detector structure 802 coupled thereto. The illustrative detector circuit 830 shown includes an ohmmeter 832, but other embodiments may use any other mechanism that would become apparent to one skilled in the art upon reading the present disclosure.

Moreover, when a defect is identified by noting a change in the resistance value for a given detector structure 802, the write transducers 806 may be used to write a signal burst at about the location of the defect for later identification (e.g., again see method 1000 below). The signal burst is preferably a short and an easily recognized pattern, e.g., such as a 12T pattern, as would be appreciated by one skilled in the art upon reading the present description. The signal burst may include encoded (written) data in some approaches, but other approaches the signal burst may simply be a magnetic transition, sequence of transitions, pattern, etc. that is easily detectable.

It should also be noted that in some embodiments, a resistor (not shown) may be coupled between the conductive layers 812 in each of the detector structures 802. Doing so may help prevent electrostatic discharge (ESD) from affecting the apparatus 800. The resistor would preferably have a high resistance value, e.g., about 1,000Ω or more, but could be higher or lower, as would be appreciated by one skilled in the art upon reading the present description. Thus, when material is smeared from one of the conductive layers 812 to the opposite conductive layer 812 across the insulating material 814, a detectable drop in resistance between the conducive layers may be noted rather than a jump from an effectively open circuit to an effectively shorted circuit. It should also be noted that a detector structure 802 may continue to function (be used to detect defects) despite experiencing a smear between the conductive layers 812. A detector structure retains at least some sensitivity even after a smearing between the conductive layers 812 has occurred. Thus, after a defect has been detected, a sensitivity associated with the detector structure 802 that detected the defect may be accounted for to compensate for the reduction in responsiveness thereof so that the detector structure 802 may continue to be used.

In some approaches, the conductive layers 812 of apparatus 800 may include permalloy, e.g., such that the conductive layers 812 resemble magnetic shields typically included in transducers of magnetic tape heads. Thus, the conductive layers 812 may be able to accurately represent the manner in which the transducers of an actual magnetic head would be effected by the magnetic tape. It follows that any of the components, dimensions, materials, etc. as described herein may be tailored to resemble those used in actual magnetic heads (e.g., in a tape library, tape drive, etc.) in order to identify defects that would have a negative effect on such actual magnetic heads. None of the specific embodiments included herein are intended to be limiting, but rather are presented by way of example.

For instance, in other approaches the conductive layers 812 may include any desired electrically conductive material to enable monitoring a resistance value of each of the detector structures. The conductive layers 812 may be of the same material, or may be different materials. Laminated conductive layers 812 may be used in some embodiments.

Performing experiments with conductive layers 812 of particular materials may enable ranking of the susceptibility to smearing of particular materials.

Where the conductive layers 812 are of differing materials, the effect of tape defects may be studied by running the tape in both directions, and determining in which direction a smear occurs. If smearing occurs in a particular direction and not the other, then the material of the leading conductive layer at the time of smearing can be investigated as a potentially smearable material.

In a further approach, the conductive layers in each pair may be of different composition, and the compositions of some of the conductive layers in one or both rows are different than other of the conductive layers in the same row. Any arrangement is possible. For example, the materials may alternate across the array, e.g., the leading array may be configured as follows: Sendust, permalloy, Sendust, permalloy . . . ; while the trailing array is configured as follows: permalloy, Sendust, permalloy, Sendust . . . . This configuration enables comparison of different materials, as well as media defects that are asymmetrical and thus create more pronounced smearing in one direction vs. the other. In such embodiments, the tape would ideally be run in both directions. Such embodiments may be configured as in FIGS. 9A and/or 9B, for example.

The insulating material 814 may include alumina according to an exemplary approach, but may include any known electrically insulating material to prevent current to pass between the conductive layers 812. The insulating material 814 may include a laminated structure of differing materials. Similarly, the array 804 of detector structures 802 may include a coating formed over a media facing surface thereof. In some approaches, the coating may resemble a magnetic head coating used on the media facing surface of magnetic heads, e.g., such as alumina, diamond-like-carbon, etc. to more accurately simulate product conditions. However, in other approaches the array 804 of detector structures 802 may not include a coating to alter the sensitivity of the detector structures 802.

Looking again to FIG. 8A, the array 804 of detector structures 802 are shown as spanning wider in the cross-track direction 810 than the array 808 of write transducers 806, as measured from outermost write transducers 806, or between the servo readers 816. The wider the detector structures 802 span in the cross-track direction 810, the more of the tape the detector structures 802 are able to monitor for defects. Thus, it is preferred that the plurality of detector structures 802 span at least as wide in the cross-track direction 810 as the array 808 of write transducers 806 do. In some embodiments, the detector structures 802 span wider in the cross-track direction 810 than the write transducers 806 do. In an exemplary approach, the array 808 of write transducers 806 may span wide enough in the cross-track direction 810 such that a width thereof corresponds to the width of a single data band of a magnetic tape being passed over the write transducers 806.

According to various other approaches, the width W of the array 804 of the plurality of detector structures 802 may span across less than a total width (in the cross-track direction 810) of a magnetic tape being passed over the detector structures 802, e.g., at least 25%, at least 30%, at least 45%, at least 50%, at least 60%, at least 75%, at least 80%, at least 90%, at least 95%, etc. of the total width of a magnetic tape being passed over the detector structures 802, but could be higher or lower.

Figure 8C:
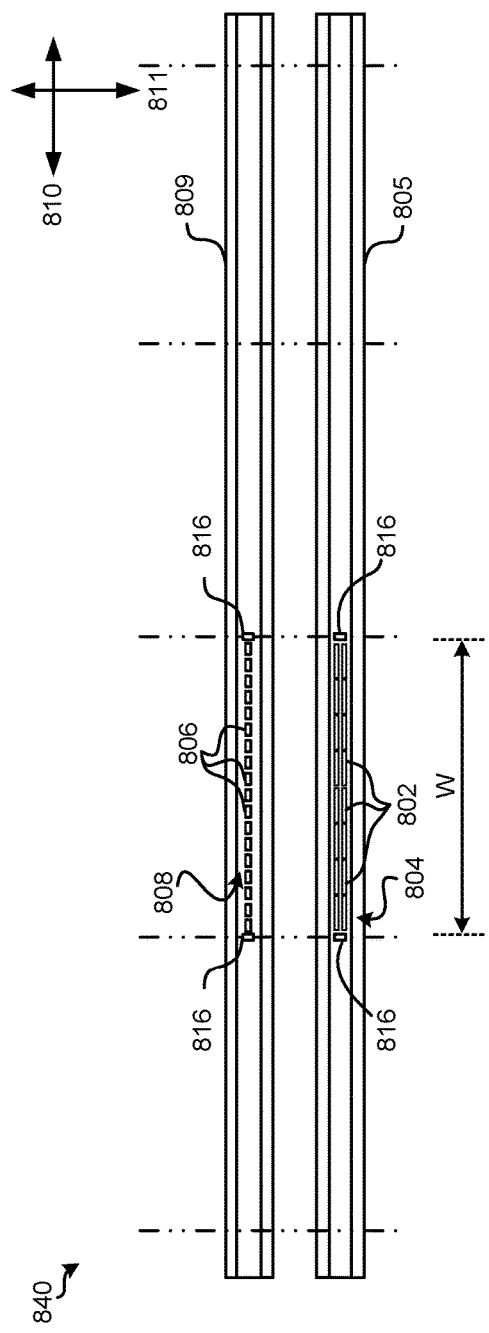
FIG. 8C is a partial top-down view of an apparatus according to one embodiment.

FIG. 8C depicts an embodiment 840 in which the width W of the array 804 of the detector structures 802 is about equal to the width of one data band, as defined between adjacent servo tracks 822. Accordingly, the tape may be passed over the array 804 of the detector structures 802 four times, with the array being stepped sequentially into the next data band after each pass. Moreover, if a tape is known to have a defect, e.g., the tape caused a short during a read/write operation and thus the data band in use at the time is known, the present embodiment may be used to detect that defect.

Figure 8D:
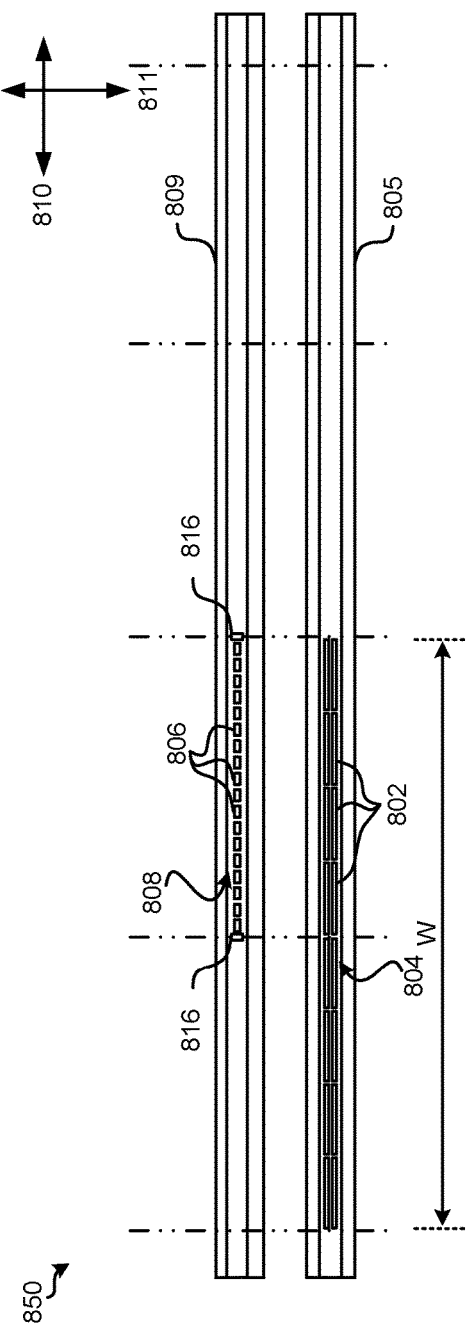
FIG. 8D is a partial top-down view of an apparatus according to one embodiment.

FIG. 8D depicts an embodiment 850 in which the width W of the array 804 of the detector structures 802 is about equal to the width of two data bands. Accordingly, the tape may be passed over the array 804 of the detector structures 802 two times, with the array being stepped to the other half of the tape after a first pass.

The spacing between adjacent detector structures 802 is preferably small to minimize the amount of tape that passes between the detector structures 802. Preferably, the sum of the widths of the detector structures 802 is at least 90% of the width W of the array, ideally at least 95% of the width W of the array.

Moreover, the width of each of the detector structures 802 measured in the cross-track direction 810 may vary depending on the number of detector structures included in the array, the overall width of the array of detector structures, a spacing between each of the detector structures in the cross-track direction, etc. According to an example, which is in no way intended to limit the invention, the array 804 of detector structures 802 may include 12 detector structures spanning across the total width of a magnetic tape being passed thereover, each of the detector structures 802 having a width of about 1 mm measured in the cross-track direction 810, and a space X of about 2 μm between each pair thereof. In another exemplary embodiment, a 24 detector structures 802, each having a width of about 0.5 mm measured in the cross-track direction 810 may be included. However, in other approaches an apparatus may include 1 detector structure that spans the entire desired width, at least 2 detector structures, 10 detector structures, at least 16 detector structures, 35 detector structures, etc. A benefit of having more detector structures is that the portion of the tape having the defect is more precisely determined, e.g., by correlating the section of tape with the position of the particular detector structure 802 that experienced the short.

It should also be noted that although a plurality of write transducers 806 are included in the present embodiment, in other embodiments fewer write transducers may be included. As mentioned above, in some approaches, only a single write transducer may be included. The single write transducer may span wider in the cross-track direction 810 in comparison to a standard write transducer, or may have dimensions similar to any conventional write transducer, e.g., depending on the desired approach. It is preferred that at least one write transducer is included, however some embodiments may not have any write transducers, as will be described in further description below.

Figure 8E:
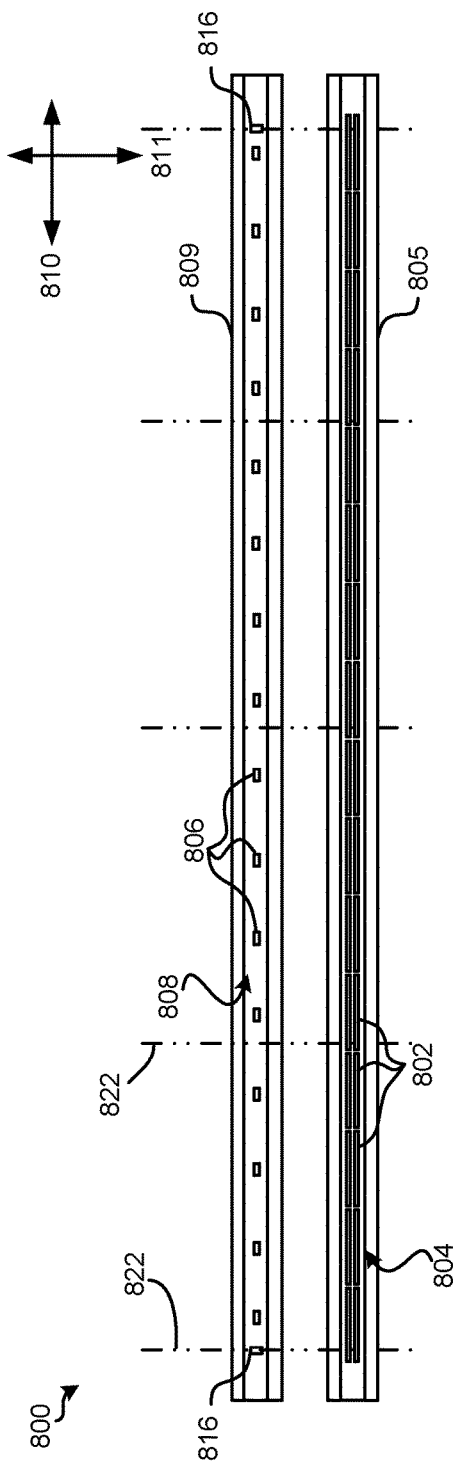
FIG. 8E is a partial top-down view of an apparatus according to one embodiment.
Figure 8F:
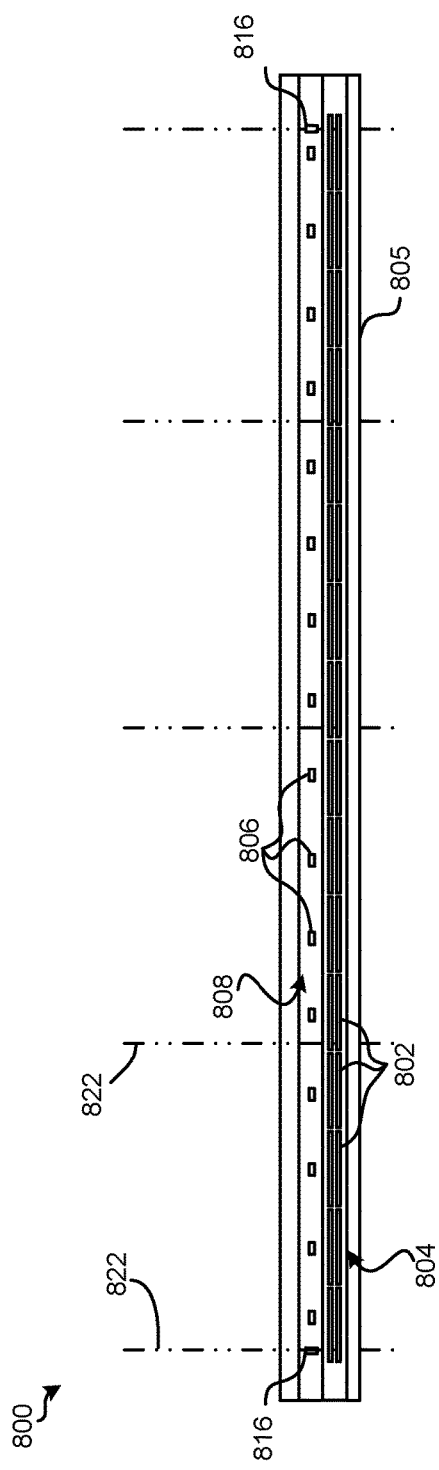
FIG. 8F is a partial top-down view of an apparatus according to one embodiment.

In further embodiments, write transducers may be aligned with the detector structures in the tape travel direction. This may improve detection, as the written signal burst may be written by the writer in alignment with the position of the detector structure that encountered the defect. For example, FIG. 8E depicts an embodiment having a write transducer 808 aligned with each detector structure 802. The write transducers 808 are positioned on a second module 809. However, as shown in FIG. 8F, the write transducers 808 may be positioned on the same module 805 as the detector structures 802. In some approaches, the write transducers 808 may be centered with respect to the detector structure 802 associated therewith. In other approaches, the write transducers 808 may be offset laterally with respect to the detector structure 802 associated therewith.

The write transducers in various embodiments may be configured to write predefined patterns, e.g., in response to a detector structure encountering a defect. The patterns may be configured to provide any desired information. For example, where each write transducer writes a signal burst in a unique pattern that is specific to that write transducer and different than patterns the other write transducers write, the pattern can later be used to identify which writer wrote the written signal burst. In other approaches, more than one writer may write a signal burst, where the relative positions and/or written transitions of the signal bursts has some predefined significance.

Referring again to the embodiment illustrated in FIGS. 8A-8B, the first and second arrays 804, 808 are oriented in a cross-track direction 810, but in other approaches the first and/or second array 804, 808 may have any desired orientation. For example, the first and/or second array 804, 808 may be oriented at an angle relative to the cross-track direction 810, oriented along a curved line, interleaved among other components, etc. depending on the desired approach.

The first and second arrays 804, 808 are also positioned on first and second modules 805, 809, respectively, which may be positioned relative to each other to wrap a tape such as the head in FIG. 2. However, in other approaches, the first and/or second array 804, 808 may be positioned on a common (single) module, a third module may be implemented (e.g., see FIGS. 9A-9B), a fourth module may be included, etc. Again, the specific implementations illustrated in apparatus 800 of FIGS. 8A-8B are in no way intended to limit the invention.

Figure 9A:
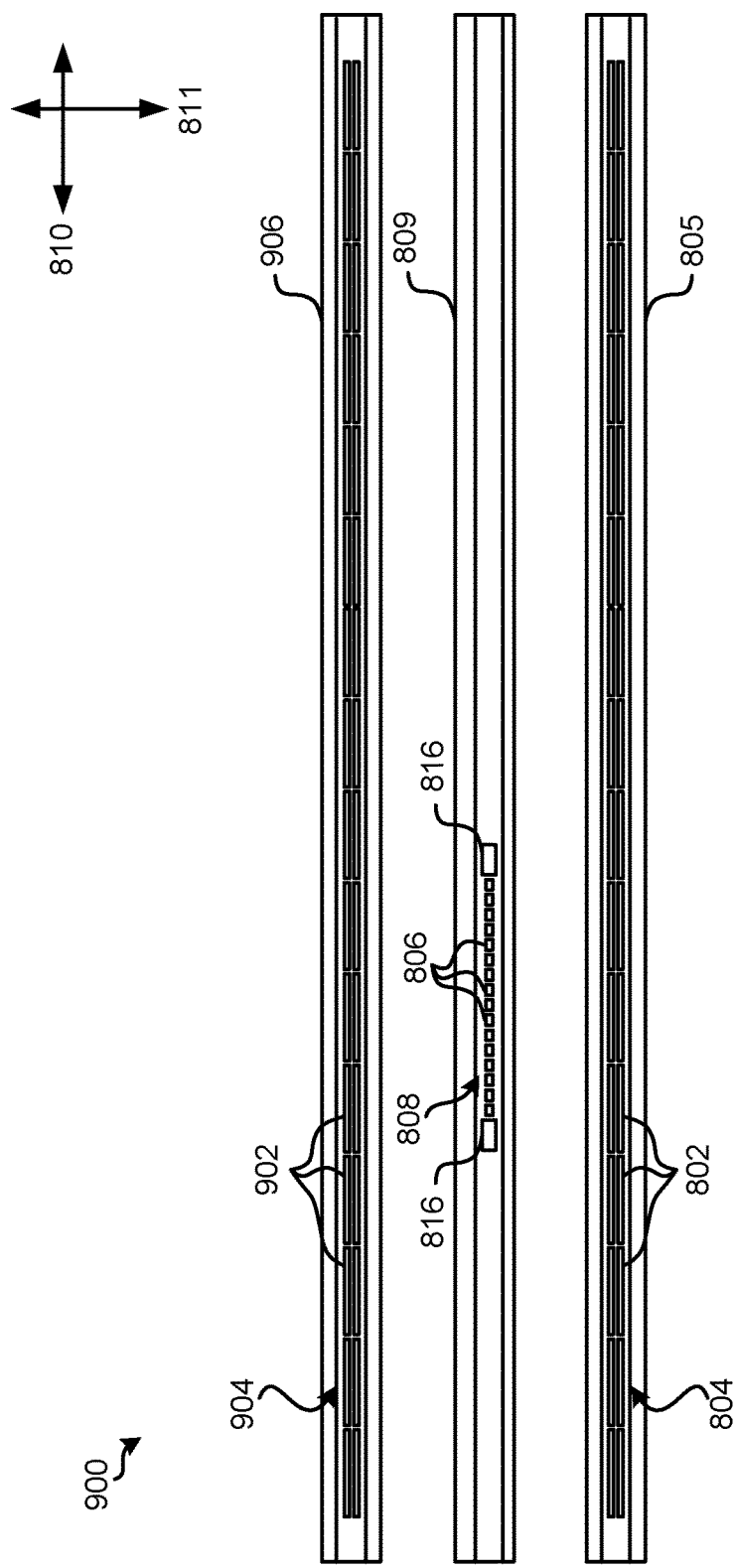
FIG. 9A is a partial top-down view of an apparatus according to one embodiment.
Figure 9B:
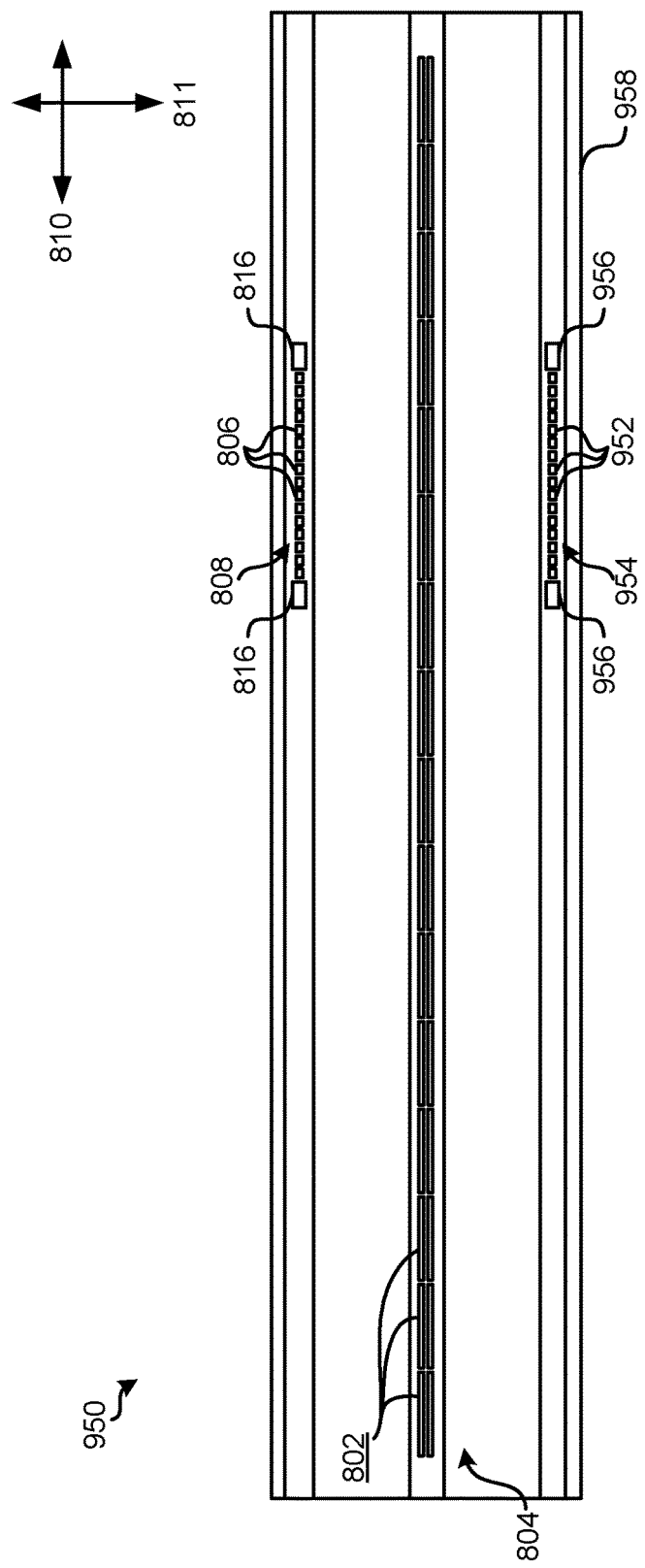
FIG. 9B is a partial top-down view of an apparatus according to one embodiment.

Referring momentarily to FIGS. 9A-9B, apparatuses 900, 950 are shown in accordance with one embodiment. As an option, the present apparatuses 900, 950 may be implemented in conjunction with features from any other embodiment listed herein, such as those described with reference to the other FIGS., such as FIGS. 8A-8B. Specifically, FIGS. 9A-9B illustrate variations of the embodiment of FIGS. 8A-8B depicting several exemplary configurations within the apparatuses 900, 950. Accordingly, various components of FIGS. 9A-9B have common numbering with those of FIGS. 8A-8B.

However, such apparatuses 900, 950 and others presented herein may be used in various applications and/or in permutations which may or may not be specifically described in the illustrative embodiments listed herein. Further, the apparatuses 900, 950 presented herein may be used in any desired environment. Thus FIGS. 9A-9B (and the other FIGS.) may be deemed to include any possible permutation.

As shown in FIG. 9A, apparatus 900 includes first and second arrays 804, 808 of detector structures 802 and write transducers 806, respectively, positioned on first and second modules 805, 809, respectively. However, in addition to the first and second arrays 804, 808, apparatus 900 includes a third array 904 of detector structures 902 positioned on a third module 906. Detector structures 902 preferably have the same or similar composition as detector structures 802, but they may be different (e.g., have different widths, different material compositions, a different number of detector structures in the array 904, etc.) depending on the desired approach. Moreover, according to different approaches, any one or more of the modules may have beveled edges, rather than skiving edges. In one approach, the second module 809 (the center module) may have beveled edges. Depending on how the modules are arranged to wrap the tape, the downstream module may or may not engage the tape.

By including a third array 904 of detector structures 902 positioned on an opposite side of the second array 808 of write transducers 806 as the first array 804 of detector structures 802, apparatus 900 enables bi-directional functionality. As mentioned above, the write transducers 806 may be used to write a signal burst at about the longitudinal location of an identified defect on a magnetic tape being examined, and therefore it is preferred that the write transducers 806 are positioned in the down-track direction relative to the detector structures 902 being used. Once a defect is detected by one or more of the detector structures 902, one or more write transducers 806 may be directed to write the signal burst when the longitudinal position generally corresponding to the defect(s) passes over a down-stream write transducer 806 such as by delaying writing of the signal burst by the time of transit between the detector and the trailing writer as a function of distance between the detector and the trailing writer and tape velocity (e.g., again see method 1000 below). It follows that the second array 808 of write transducers 806 and the leading array of detector structures are active depending on the particular intended direction of tape travel. Thus, apparatus 900 may be configured such that the magnetic tape may fly over the downstream array of detector structures according to any of the approaches described herein, e.g., as the downstream array may not be active (e.g., used). By including a third array 904 of detector structures 902 positioned on an opposite side of the second array 808 of write transducers 806 as the first array 804 of detector structures 802, defects may be detected and flagged on the magnetic tape regardless of the direction the magnetic tape is traveling. Moreover, a tape may be run in both directions to help ensure there are no defects that are more destructive in one direction of tape travel than the other.

FIG. 9B illustrates an alternate embodiment which also allows for bi-directional functionality. However, rather than having arrays of detector structures positioned on either side of the write transducers along the intended direction of magnetic media travel 811, apparatus 950 includes first and second arrays 804, 808 of detector structures 802 and write transducers 806, respectively, as well as a third array 954 of write transducers 952 and servo readers 956 positioned on an opposite side of the first array 804 of detector structures 802 as the second array 808 of write transducers 806. Moreover, the first, second and third arrays 804, 808, 954 are shown as included on a single module 958. However, as previously mentioned, the arrays of a given embodiment may be included on any number of desired modules.

Similar to the approach described above, here the first array 804 of detector structures 802 and the downstream array of write transducers may be active depending on the particular direction of tape travel thereacross. Thus, it is preferred that the magnetic tape does not fly over the downstream array. Again, by implementing a third array 954, apparatus 950 enables bi-directional functionality depending on the direction the magnetic tape is traveling as described above.

Referring again to FIGS. 8A-8B, the modules 805, 809 may be included in a magnetic head, e.g., see 126 of FIG. 1A, thereby enabling magnetic tape to be passed over the components included in the first and second arrays 804, 808 on the modules 805, 809. Moreover, although the insulating material 814 is the only layer positioned between the conductive layers 812 in each of the detector structures 802 such that none of the detector structures 802 include an operable reader for reading data from a magnetic tape, in some embodiments a detector structure may include a read transducer. Accordingly, in some embodiments read transducers may be repurposed to serve as detector structures for detecting defects on a magnetic tape. In some approaches, the modules 805, 809 and arrays 804, 808 described herein may be implemented in a tape drive, or another configuration that allows for tape to be passed thereover.

Figure 10:
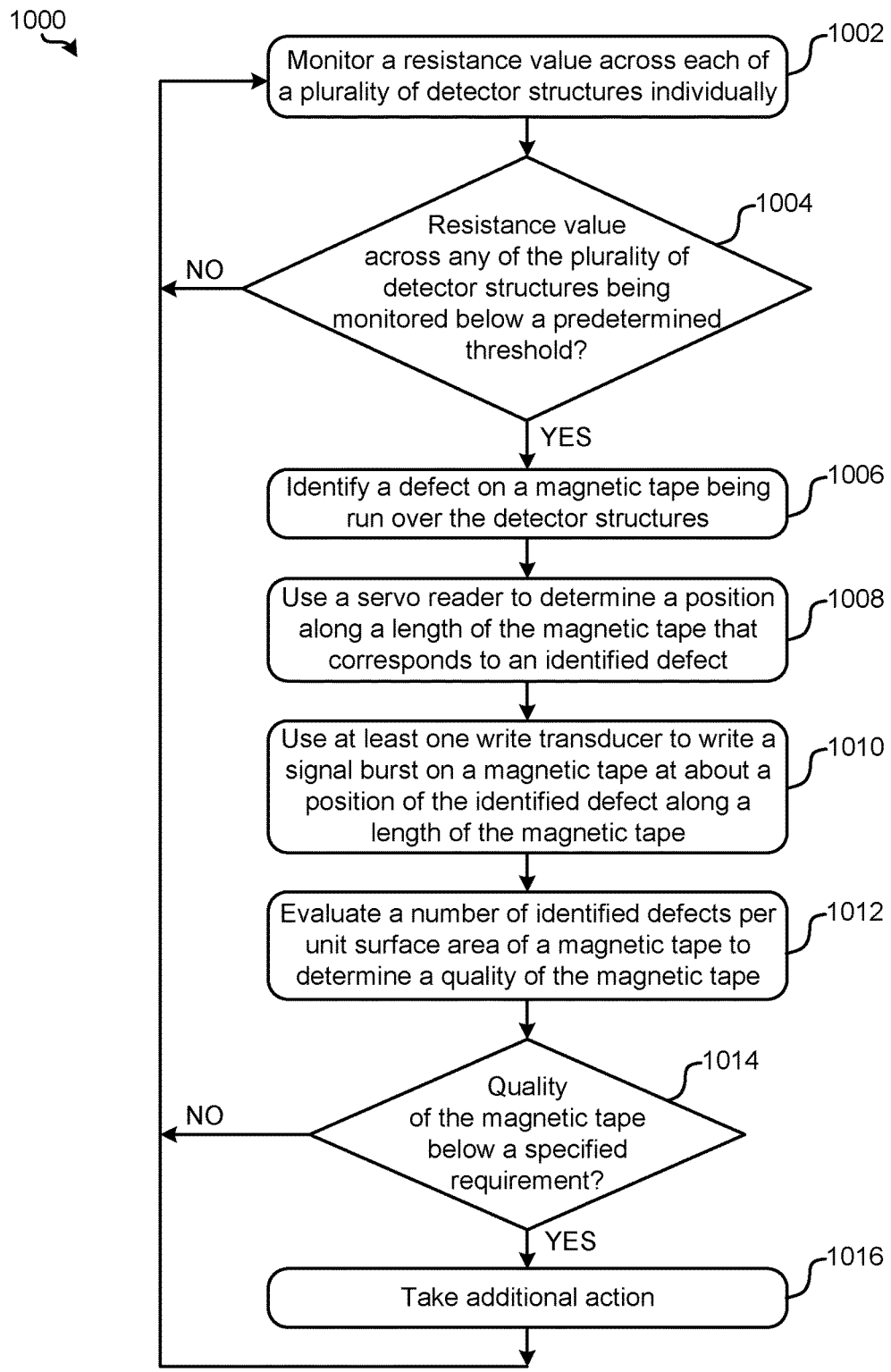
FIG. 10 is a flowchart of a method according to one embodiment.

As mentioned above, once a defect is detected on a magnetic tape by one or more detector structures, one or more write transducers may be directed to write a signal burst to the magnetic tape when the lateral position corresponding to the defect(s) passes over a down-stream write transducer. FIG. 10 illustrates a flowchart of a computer-implemented method 1000 for conducting such a process according to one embodiment. The method 1000 may be performed in accordance with the present invention in any of the environments depicted in FIGS. 1-9B, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art. In one approach, the method is performed by the controller of a tape drive.

As shown in FIG. 10, method 1000 includes monitoring a resistance value of each of a plurality of detector structures individually. See operation 1002. The detector structures may be positioned in an array according to any of the approaches illustrated in FIGS. 8A-9B. Thus the plurality of detector structures that the resistance value is monitored across may depend on such factors as the intended direction of media travel (e.g., tape travel), the orientation of detector structures with respect to write transducers, whether write transducers are included in a given embodiment (e.g., see FIG. 11), etc.

According to one approach, operation 1002 may include monitoring a resistance value of each of the plurality of detector structures of two different arrays, (e.g., such as arrays 804 and 904 of FIG. 9A), for redundancy. Thus, if a defect is detected by a detector structure in a leading one of the arrays 804, 904, the trailing one of the arrays 804, 904 may be used to verify the defect, e.g., by determining whether a detector structure in the trailing array which corresponds to (aligns with) the detector structure in the leading array also detects the defect.

With continued reference to method 1000, decision 1004 determines whether the resistance value of any of the plurality of detector structures being monitored drops below a predetermined threshold. As described above, each of the detector structures preferably include a pair of conductive layers (e.g., shields) which are separated by an electrically insulating material. Either conductive layer and/or the electrically insulating material may include any of the types of materials described herein, e.g., depending on the desired approach. Momentarily referring back to FIGS. 8A-8B, as a magnetic medium (e.g., tape) is passed over detector structures 802, defects on the magnetic medium may cause material from one of the conductive layers 812 to smear across the insulating material 814, to the opposite conductive layer 812. The smear of conducive material across the insulating material 814 may cause at least a partial electrical short in the detector structure 802. Thus, by measuring and monitoring a resistance value between the conductive layers 812 of the detector structure 802, defects on a magnetic tape may be identified by noting changes in the resistance value.

While a change in resistance value is used in this exemplary embodiment, any known method enabling detection of a short may be used in various embodiments. For example, equivalently to detecting whether resistance values fall below a threshold, mere detection of a current may indicate presence of a short. Similarly, detection of a change in voltage may be indicative of a short.

It should also be noted that in some embodiments, none of the detector structures include an operable reader for reading data from a magnetic tape. However, this is in no way intended to limit the invention. For instance, in other embodiments, one or more of the plurality of detector structures may simply be a read transducer, and may thereby include an operable reader, e.g., for reading data from a magnetic tape and/or servo readers for positioning the tape.

Referring again to method 1000 of FIG. 10, it should be noted that "below a threshold" is in no way intended to limit the invention. Rather than determining whether a value is below a threshold, equivalent determinations may be made, e.g., as to whether a value is within a predetermined range, whether a value is outside a predetermined range, whether an absolute value is above a threshold, whether a value is above a threshold, etc., depending on the desired approach.

As shown, method 1000 returns to operation 1002 in response to determining that the resistance value of all of the plurality of detector structures has not dropped below a predetermined threshold. Upon returning to operation 1002, the resistance value of each of a plurality of detector structures individually may continue to be monitored. However, method 1000 proceeds to operation 1006 in response to determining that the resistance value of any of the plurality of detector structures drops below a predetermined threshold. In other words, method 1000 proceeds to operation 1006 in response to detecting a sufficient change in a resistance value of at least one of the detector structures, which includes identifying a defect on a magnetic tape being run over the detector structures.

However, the defect may have caused a smear to occur anywhere along the width of the detector structure. Thus, operation 1006 may be limited in the amount of detail with which the location of the defect along the width of the magnetic tape may be identified, e.g., depending on the width of the detector structure, the number of detector structures, etc. Thus, fewer wider, or additional narrower, detector structures may be included in a given embodiment, e.g., depending on the desired precision by which the embodiment may be able to detect defects along the cross-track direction.

Moreover, operation 1008 includes using a servo reader to determine a position along a length of the magnetic tape that corresponds to an identified defect. An embodiment may include one or more servo readers in order to determine a position along the length of a magnetic tape that corresponds to a detected defect thereon, in addition to other functions such as track following and skew following. According to one approach, the servo reader may determine the position along the length of the magnetic tape corresponding to an identified defect by using linear position (LPOS) information encoded in a servo track. The servo reader may be instructed to identify an LPOS from the servo track when a defect is identified, preferably simultaneously. Thus, the LPOS of the defect along the length of the magnetic tape may be determined and stored for later use to locate the defect. The positions along a length of the magnetic tape which correspond to identified defects may be stored in memory, sent to a user, compiled in a table, used to determine whether the magnetic media meets specified requirements, etc.

In another embodiment, the servo reader may be used to help keep the array of detector structures at a fixed lateral position relative to the magnetic tape. By keeping the array of detector structures at a fixed lateral position relative to the magnetic tape, one or more defects may be passed over the same location on the detector structures, e.g., to ensure that they are detected. Thus, in some approaches, the arrays of detector structures and write transducers may be included in a track-following actuator assembly as would be appreciated by one skilled in the art upon reading the present description.

Preferably, tape skew following is also applied for even greater positioning accuracy. If tape skew is not corrected for, and multiple passes of the tape over the head are performed, there is a possibility that the resulting smears will likely not be formed in the same location. Servo readers on different modules may be used to detect tape skew.

Method 1000 further includes using at least one write transducer to write a signal burst on a magnetic tape at about a position of the identified defect along a length of the magnetic tape. See operation 1010. Again, write transducers may be used to write a signal burst near the location of an identified defect on a magnetic tape being examined, and therefore it is preferred that the write transducers are positioned in the down-track direction relative to detector structures being used as described herein. Once a defect is detected by one or more of the detector structures, one or more (e.g., all) write transducers may be triggered to write the signal burst when the lateral position corresponding to the defect(s) passes over the down-stream write transducers. The signal burst is preferably short and an easily recognized pattern, e.g., such as a 12T pattern, as would be appreciated by one skilled in the art upon reading the present description. The signal burst may include encoded (written) data in some approaches, but other approaches the signal burst may simply be a pattern that is easily detectable.

For situations where the trigger is produced as a result of an upstream module detecting a defect on a magnetic tape, a delay in writing the signal burst is preferably implemented such that the signal burst is written at about the same longitudinal location as the detected defect. In other words, a time delay corresponding to the amount of time it takes for the magnetic tape to travel from the detector structures to the downstream writer transducers is preferably implemented before writing the signal burst. Accordingly, the leading edge of the signal burst may align with the location of the defect. Moreover, the delay may vary depending on the speed at which the magnetic tape is traveling, the size of the defect, the spacing between the detector structures and the write transducers, etc. This further improves the ability to later locate the location of the defect on the magnetic tape. With standard positioning accuracy, a defect may be located in an area approximately 1 mm$^2$ or smaller, e.g., depending on the number of detectors.

Moreover, because the array of detector structures preferably spans at least as wide in the cross-track direction as the write transducers (e.g., see FIGS. 8A-9B), and ideally greater, it is possible that the defect is detected by a detector structure at a position along the cross-track direction that does not align with any of the write transducers in the intended direction of media travel. Thus, the signal burst may not correspond to the actual location of the identified defect. Rather, the signal burst may simply indicate a position along the length of the tape where the defect is located. The defect may therefore be located somewhere along the cross-track direction from where the signal burst was written to the magnetic tape. In some approaches, the LPOS information collected by one or more servo readers may be utilized in combination with the signal bursts written to the magnetic tape to later locate the defects. According to an example, which is in no way intended to limit the invention, a user may utilize the LPOS information corresponding to a detected defect to determine a general location of a defect on a magnetic tape. After accessing a portion of the tape corresponding to the LPOS information, a user may inspect the tape for the signal burst written thereto. Moreover, after locating the signal burst on the tape, a user may visually inspect the tape along a width thereof that passes through the signal burst. This process may be repeated for any one or more of the other identified defects for the magnetic tape.

Inspecting the tape for the signal burst written thereto and/or for the defect itself may include using conventional readers to detect the signal burst to identify the approximate location of the defect, and then inspecting the surface of the tape using a technique such as atomic-force microscopy (AFM), etc., or any other form of inspecting the tape which would be apparent to one skilled in the art upon reading the present description. See also the method of FIG. 12, described below.

Referring still to FIG. 10, method 1000 additionally includes evaluating a number of identified defects per unit surface area of a magnetic tape to determine a quality of the magnetic tape. See operation 1012. According to some approaches, a whole magnetic tape may be examined for defects thereon before the results are evaluated according to operation 1012. However, in other approaches, the number of defects identified on a magnetic tape may be evaluated according to operation 1012 after a sufficient amount (e.g., length) of the magnetic tape has been examined, e.g., such as at least a quarter of the total length of the magnetic tape, at least half of the total length of the magnetic tape, at least a unit service area of the magnetic tape, etc. Accordingly, the evaluation performed in operation 1012 may effectively serve as an approximation of the defect distribution for the remainder of the magnetic tape.

Furthermore, decision 1014 includes determining whether the quality of the magnetic tape falls below a specified requirement. As mentioned above, different magnetic media may have specified requirements, e.g., depending on the type of magnetic media, user preferences, sensitivity of data, etc. Thus, by comparing the actual quality of the magnetic tape (e.g., based on the number of identified defects per unit surface area of a magnetic tape) with a specified requirement, method 1000 may determine if the magnetic tape is suitable for use. This may be particularly beneficial when testing magnetic tape before they are implemented in an actual tape head in order prevent damage to sensors in such magnetic heads caused by an undesirably high concentration of defects on the magnetic tape. As mentioned above, various embodiments described herein may be able to detect defects and/or determine if the amount of burnishing performed on a given media meets specified requirements. Thus, embodiments described herein may be able to determine whether the amount of burnishing performed on a magnetic tape is sufficient to reduce the likelihood of damaging transducers brought into contact therewith to an acceptable level.

Moreover, media that does not meet requirements (e.g., that has not been sufficiently burnished) may be dealt with as desired. Accordingly, operation 1016 includes taking additional action in response to determining that the quality of the magnetic tape does fall below a specified requirement. According to various approaches, the additional action may include inspecting the defects, burnishing or re-burnishing the magnetic tape, rejecting the magnetic tape from being used entirely, reformulating the magnetic tape to fix one or more of the particular defects, etc. As shown, method 1000 returns to operation 1002 in response to determining that the quality of the magnetic tape has not fallen below a specified requirement, or once operation 1016 has been performed, again such that the resistance value of each of a plurality of detector structures individually may continue to be monitored.

FIGS. 11A-11B illustrate a representative schematic view of an apparatus 1100 having a wiring configuration that may be used to couple the detector structures to a controller and/or other monitoring device, in accordance with one embodiment. As an option, the present apparatus 1100 may be implemented in conjunction with features from any other embodiment listed herein, such as those described with reference to the other FIGS., such as FIGS. 8A-10. Specifically, FIGS. 11A-11B illustrates variations of the embodiment of FIGS. 8A-8B depicting several exemplary configurations within the apparatus 1100. Accordingly, various components of FIGS. 11A-11B have common numbering with those of FIGS. 8A-8B.

However, such apparatus 1100 and others presented herein may be used in various applications and/or in permutations which may or may not be specifically described in the illustrative embodiments listed herein. Further, the apparatus 1100 presented herein may be used in any desired environment. Thus FIGS. 11A-11B (and the other FIGS.) may be deemed to include any possible permutation.

As shown in the representation in FIG. 11B, the detector structures 802 of apparatus 1100 may be electrically coupled to input/output (I/O) connection pads 1102 on the detector module 805 using conductive vias 1106 of conventional construction. In some approaches, the I/O connection pads 1102 may be wire bond pads. Moreover, a device for detecting a short may be coupled to each pair of the connection pads 1102. Illustrative devices include ohmmeters, ammeters, voltage detectors, etc. In one approach, an ohmmeter 1104 may be coupled to each pair of the connection pads 1102 such that a resistance between the conductive layers 812 in each of the detector structures 802 may be monitored for a sufficient change indicating that a defect has come into contact with the detector structure. The ohmmeters 1104 may in turn be coupled to a controller configured to perform any one or more of the processes described herein.

Figure 11C:
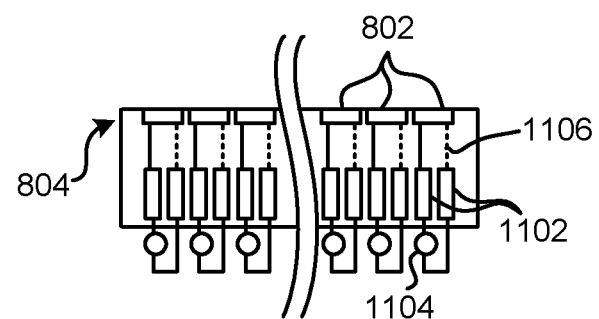
FIG. 11C is a partial cross-sectional view of an apparatus according to one embodiment.
Figure 11D:
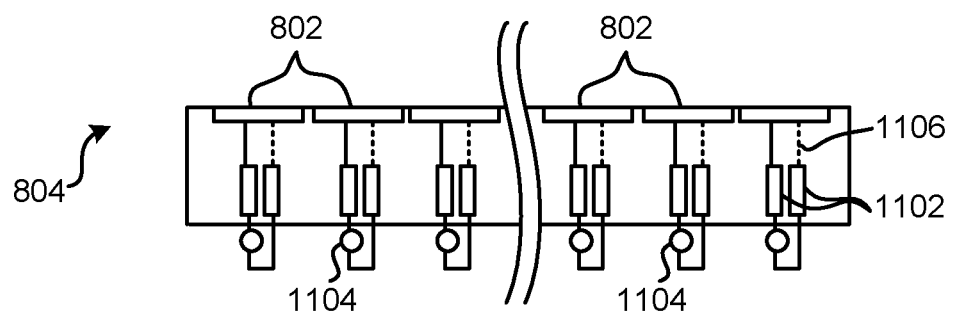
FIG. 11D is a partial cross-sectional view of an apparatus according to one embodiment.

FIGS. 11C and 11D illustrate additional layouts. These embodiments illustrate that the connection pads 1102 may be generally aligned with the detector structures 802.

According to another embodiment, an apparatus for detecting defects on a magnetic medium as described herein may include read transducers rather than write transducers. For example, the write transducers 806 positioned on the second module 809 of FIG. 9A may alternatively be read transducers which may operate in a normal read mode, e.g., if data has already been written to the magnetic medium. Thus, when a defect is identified by the detector structures, the read transducers may take note of the data written at about the same position of the defect along the magnetic medium and send, store, etc. that data for future use in relocating the identified defect. The pre-written pattern on the tape is preferably sequential in nature, e.g., an ascending bit sequence, which may repeat if necessary due to the length of the tape, to enable an easy return to the proper location, and fine enough to approximate the linear location of the defect to within a few nanometers. It follows that write transducers are preferably used when data has not yet been written to the magnetic medium being examined for defects, e.g., such as when examining an unused tape.

According to yet another embodiment, an apparatus for detecting defects on a magnetic medium as described herein may only include servo readers in addition to the detector structures. The servo readers may function as described above and take note of a LPOS that corresponds to the position of an identified defect along the magnetic medium and send, store, etc. that LPOS data for future use in relocating the identified defect. However, servo readers are again by no means required for any of the embodiments described herein to function successfully.

After one or more of the detector structures in an array have lost a sufficient amount of sensitivity from a given number of smearing events between the pairs of conductive layers thereof, the detector structures may preferably be replaced. According to some approaches, individual detector structures may be replaced with new detector structures. In other approaches, a module on which the array of detector structures are positioned may be replaced with a new module having a new array of detector structures. In yet another embodiment, a magnetic head having both detector structures and write transducers and/or read transducers as described herein may be replaced with a new magnetic head. In a further embodiment, the tape bearing surface may be gently polished, e.g., in the cross track direction, to remove the short, thereby rehabilitating the head.

As alluded to above, e.g., with reference to operation 1016 of FIG. 10, once the approximate location of the defect has been marked on the tape according to any of the approaches above, the defect may be searched for and found on the tape. According to some embodiments, the procedure for finding the defect may generally include finding the written signal burst on the tape, and searching the region of the tape in the vicinity of the signal burst for the defect.

Figure 12:
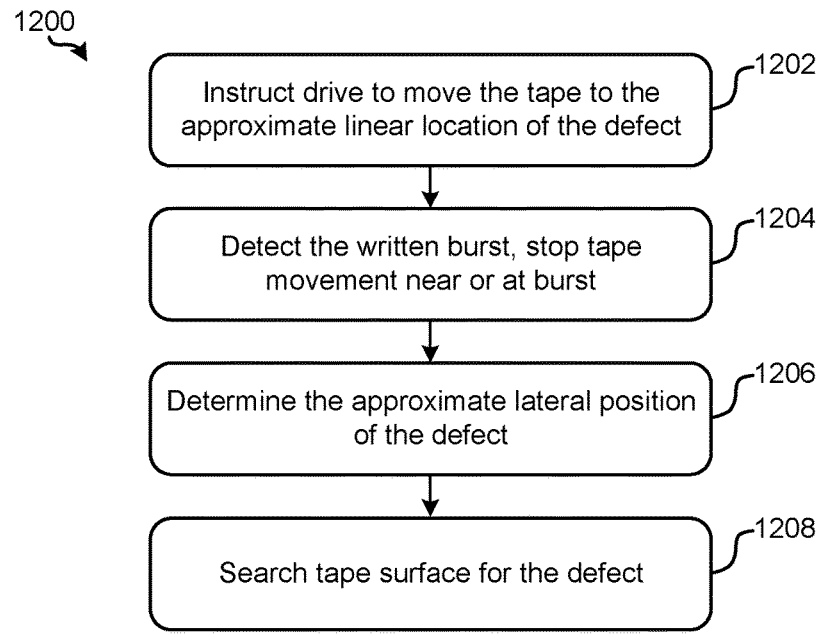
FIG. 12 is a flow diagram of a method according to one embodiment.

FIG. 12 illustrates a flowchart of a method 1200 for finding a defect on a tape according to one embodiment. The method 1200 may be performed in accordance with the present invention in any of the environments depicted in FIGS. 1-11B, among others, in various embodiments. Of course, more or less operations than those specifically described in FIG. 12 may be included in method 1200, as would be understood by one of skill in the art upon reading the present descriptions.

Each of the steps of the method 1200 may be performed by any suitable component of the operating environment and/or by or under the direction of a human operator. For example, in various embodiments, the method 1200 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art. In one approach, the method is performed by the controller of a tape drive.

In operation 1202, a drive is instructed to move the tape to the approximate linear position of the tape where the defect was detected, relative to a reader. Again, LPOS information stored when the defect was detected may be used to move the tape to the position. The drive moving the tape may be a different drive than the one that detected the defect. In other approaches, the drive moving the tape may be the drive that detected the defect, and presumes said drive has at least one reader and is configured to detect the written signal burst, as will soon become apparent in the discussion of operation 1204. Using linear position information allows the tape to be quickly moved to the approximate location of the defect.

In operation 1204, the drive is instructed to detect the written signal burst, and stop tape movement near or at the signal burst. The tape may be moved more slowly for this operation than operation 1202. In some approaches, operation 1202 may be omitted, and the tape simply read in operation 1204 until the written signal burst is detected.

Assuming the first transition of the signal burst is aligned with the defect, the first transition may be detected using conventional techniques, e.g., magnetic force microscopy, ferrofluid tape developing, etc.

At this point, the approximate location of the defect is identified, and techniques such as AFM scanning, optical scanning, etc. may be used to search the tape surface for the defect. A section of the tape may be sectioned and placed in the desired tool, physically and/or optically marked and unspooled for analysis, etc.

Typically, tape defects are less than 3 microns in diameter, and in may be closer to 1 micron or less. A one-half-inch tape is approximately 12,700 microns wide, and so the maximum diameter of the defect may be less than $\frac{1}{5000}^{th}$ the width of the tape, and more likely less than $\frac{1}{10000}^{th}$ the width of the tape. It follows that searching using techniques having high enough resolution such as AFM to find the defect will be extremely slow. Accordingly, some approaches use further refinement to determine the approximate lateral location of the defect, thereby significantly reducing the search area on tape, which in turn greatly reduces the time required to find the defect.

In operation 1206, the approximate lateral position of the defect in the cross-track direction is determined. In one approach, the lateral position may be correlated to the detector that detected the defect, and the area on the tape that was aligned with that detector may be analyzed. The granularity of the search area is thus dependent upon the width of the detector.

Figure 13:
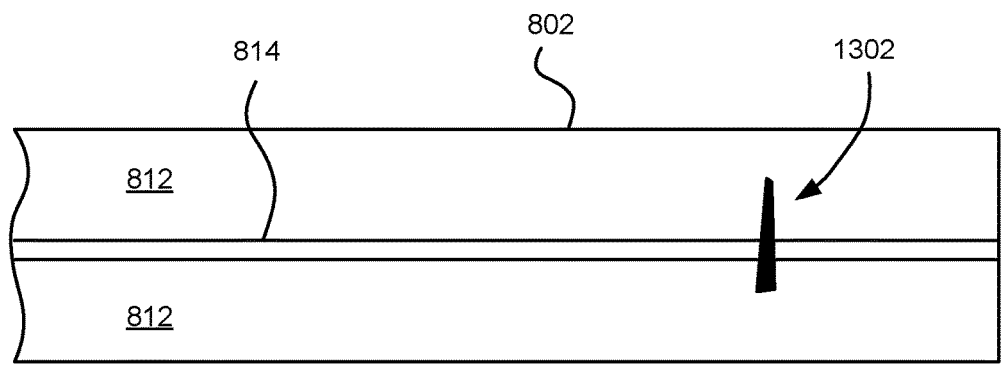
FIG. 13 illustrates a detector structure with smeared material thereon.

In a preferred embodiment, the search area is further reduced by analyzing the detector structure that detected the defect, using any known technique, to determine the location of the material smeared by the defect. Preferably, an optical technique is used to find the smear, optionally with machine vision, as optical techniques enable much more rapid scanning than scanning techniques such as AFM. FIG. 13 depicts a detector structure 802 having a smear 1302 of conductive material passing from the lower conductive layer 812, across the insulating layer 814 onto the upper conductive layer 812, e.g., as caused by a defect on a tape passing in an upward direction across the detector structure 802.

Once the location of the smeared material is known, the distance in the cross track direction from that location to the projected lateral location of some convenient known datum is then measured. Such datum may be the edge of the servo pattern, an edge of a writer (e.g., the first writer that wrote), the edge of a servo reader, etc. Then the corresponding area of the tape may be analyzed. This significantly reduces the search area, and may reduce the search time to find the defect to mere minutes or hours. Any known process of detecting the location of the smear may be used. Preferred approaches use optical detection to locate the smear. In one approach, dark field microscopy may be used to locate the smear. Other approaches include inspection via differential interference contrast (DIC) techniques, AFM, etc.

In operation 1208, a search for the defect is conducted using any known technique, e.g., AFM. Once the defect is found, further operations may be performed, such as identifying and storing characteristics of the defect, sending the defect away for analysis, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   at least one write transducer; and
   a plurality of detector structures positioned in an array,
   wherein each of the detector structures includes a pair of conductive layers separated by an insulating material,
   with a proviso that none of the detector structures include an operable reader for reading data from a magnetic medium.

2. The apparatus as recited in claim 1, comprising a plurality of write transducers positioned in a second array.

3. The apparatus as recited in claim 1, wherein a distance separating the conductive layers of each of the detector structures, measured in an intended direction of magnetic media travel, is in a range of from about 2 nm to about 10 nm.

4. The apparatus as recited in claim 1, wherein the insulating material is the only layer positioned between the conductive layers in each of the detector structures.

5. The apparatus as recited in claim 1, comprising:
   a controller configured to: monitor a resistance value of each of the detector structures; and identify a defect on a magnetic medium in response to detecting a change in a resistance value of at least one of the detector structures.

6. The apparatus as recited in claim 5, comprising:
   a servo reader,
   wherein the controller is configured to use the servo reader to determine a position along a length of the magnetic medium that corresponds to an identified defect.

7. The apparatus as recited in claim 1, wherein the array of detector structures is wider in a cross-track direction than an array of the at least one write transducer.

8. The apparatus as recited in claim 1, wherein the array of detector structures is about as wide in a cross-track direction as an array of the at least one write transducer.

9. The apparatus as recited in claim 1, wherein the array of detector structures is about as twice as wide in a cross-track direction as an array of the at least one write transducer.

10. The apparatus as recited in claim 1, wherein the conductive layers of at least some of the detector structures have a different composition.

11. The apparatus as recited in claim 10, wherein first ones of the conductive layers are arranged linearly in the array above second ones of the conductive layers, wherein compositions of some of the first conductive layers are different than other of the first conductive layers.

12. The apparatus as recited in claim 1, wherein the insulating material includes a laminate of layers.

13. The apparatus as recited in claim 1, comprising at least one electronic lapping guide.

14. The apparatus as recited in claim 1, comprising a resistor associated with each of the detector structures, each resistor coupling the respective pair of conductive layers together.

15. The apparatus as recited in claim 1, further comprising:
- a drive mechanism for passing a magnetic medium over the detector structures; and
- a controller electrically coupled to the magnetic head.

16. A computer-implemented method, comprising:
- monitoring a resistance value of each of a plurality of detector structures positioned in an array; and
- detecting a change in a resistance value of at least one of the detector structures for identifying a defect on a magnetic medium,
- wherein each of the detector structures includes a pair of conductive layers separated by an insulating material,
- with a proviso that none of the detector structures include an operable reader for reading data from a magnetic medium.

17. The computer-implemented method as recited in claim 16, comprising:
- using a servo reader to determine a position along a length of the magnetic medium that corresponds to an identified defect.

18. The computer-implemented method as recited in claim 16, comprising:
- using at least one write transducer to write a signal burst on a magnetic medium at about a position of an identified defect along a length of the magnetic medium.

19. The computer-implemented method as recited in claim 18, wherein a width of the array of detector structures is wider in a cross-track direction than an array of the at least one write transducer.

20. A computer program product comprising a computer readable storage medium having program instructions embodied therewith, the program instructions executable by a controller to cause the controller to:
- monitor, by the controller, a resistance value of each of a plurality of detector structures positioned in an array;
- detect, by the controller, a change in a resistance value of at least one of the detector structures, for identifying an approximate location of defect on a magnetic medium; and
- cause, by the controller, a write transducer to write a signal burst on the magnetic medium in response to detecting the change in resistance value,
- wherein each of the detector structures includes a pair of conductive layers separated by an insulating material,
- with a proviso that none of the detector structures include an operable reader for reading data from a magnetic medium.

* * * * *